(12) United States Patent  
Itagaki et al.

(10) Patent No.: US 8,711,755 B2  
(45) Date of Patent: Apr. 29, 2014

(54) WIRELESS COMMUNICATION SYSTEM, WIRELESS COMMUNICATION DEVICE, WIRELESS COMMUNICATION METHOD, AND PROGRAM

(75) Inventors: Takeshi Itagaki, Tokyo (JP); Katsutoshi Itoh, Tokyo (JP)

(73) Assignee: Sony Corporation, Tokyo (JP)

( * ) Notice: Subject to any disclaimer, the term of this patent is extended or adjusted under 35 U.S.C. 154(b) by 1148 days.

(21) Appl. No.: 12/328,749

(22) Filed: Dec. 4, 2008

(65) Prior Publication Data

US 2009/0168689 A1    Jul. 2, 2009

(30) Foreign Application Priority Data

Dec. 26, 2007 (JP) ................ P2007-334206

(51) Int. Cl.
*H04J 3/08* (2006.01)
(52) U.S. Cl.
USPC ........................ 370/315; 455/452.2
(58) Field of Classification Search
USPC ................................ 370/315, 318
See application file for complete search history.

(56) References Cited

U.S. PATENT DOCUMENTS

| | | | | |
|---|---|---|---|---|
| 2004/0246934 | A1* | 12/2004 | Kim | 370/338 |
| 2006/0120334 | A1* | 6/2006 | Wang et al. | 370/338 |
| 2006/0155856 | A1* | 7/2006 | Nakashima et al. | 709/227 |
| 2007/0280180 | A1* | 12/2007 | Dalmases et al. | 370/338 |

FOREIGN PATENT DOCUMENTS

| | | |
|---|---|---|
| JP | 2003-348103 | 12/2003 |
| JP | 2004-248180 | 5/2006 |
| JP | 2006-128949 | 5/2006 |
| JP | 2007-096862 | 4/2007 |
| JP | 2009-500969 | 1/2009 |
| WO | WO 2007/122727 | 1/2007 |
| WO | WO 2007/122727 | 11/2007 |

* cited by examiner

*Primary Examiner* — David Oveissi

(74) *Attorney, Agent, or Firm* — Sherr & Jiang, PLLC

(57) ABSTRACT

A wireless communication system is provided that includes a first wireless communication device, a second wireless communication device, and a base station. The first and second wireless communication devices perform one of indirect communication via the base station and direct communication not passing via the base station. The first wireless communication device obtains the type of communication function with which the second wireless communication device is compatible, and transmits a data frame using at least one of the communication functions with which both the first and second wireless communication devices are compatible. The second wireless communication device measures communication quality of the data frame transmitted from the first wireless communication device for each communication function used. One of the first wireless communication device and the second wireless communication device, based on the communication quality, determines whether to perform one of the indirect communication and the direct communication.

17 Claims, 18 Drawing Sheets

FIG.8

| COMMON MEASUREMENT SET | DIRECT LINK MEASUREMENT SET |
|---|---|
| -20 MHz BANDWIDTH<br>  -1Stream...o<br>  -2Stream...×<br>  -3Stream...×<br>  -4Stream...×<br>-40 MHz BANDWIDTH<br>  -1Stream...o<br>  -2Stream...×<br>  -3Stream...×<br>  -4Stream...×<br><br>-TxBF COMPATIBLE...× | -20 MHz BANDWIDTH<br>  -1Stream...o<br>  -2Stream...o<br>  -3Stream...o<br>  -4Stream...×<br>-40 MHz BANDWIDTH<br>  -1Stream...o<br>  -2Stream...o<br>  -3Stream...o<br>  -4Stream...×<br><br>-TxBF COMPATIBLE...o |

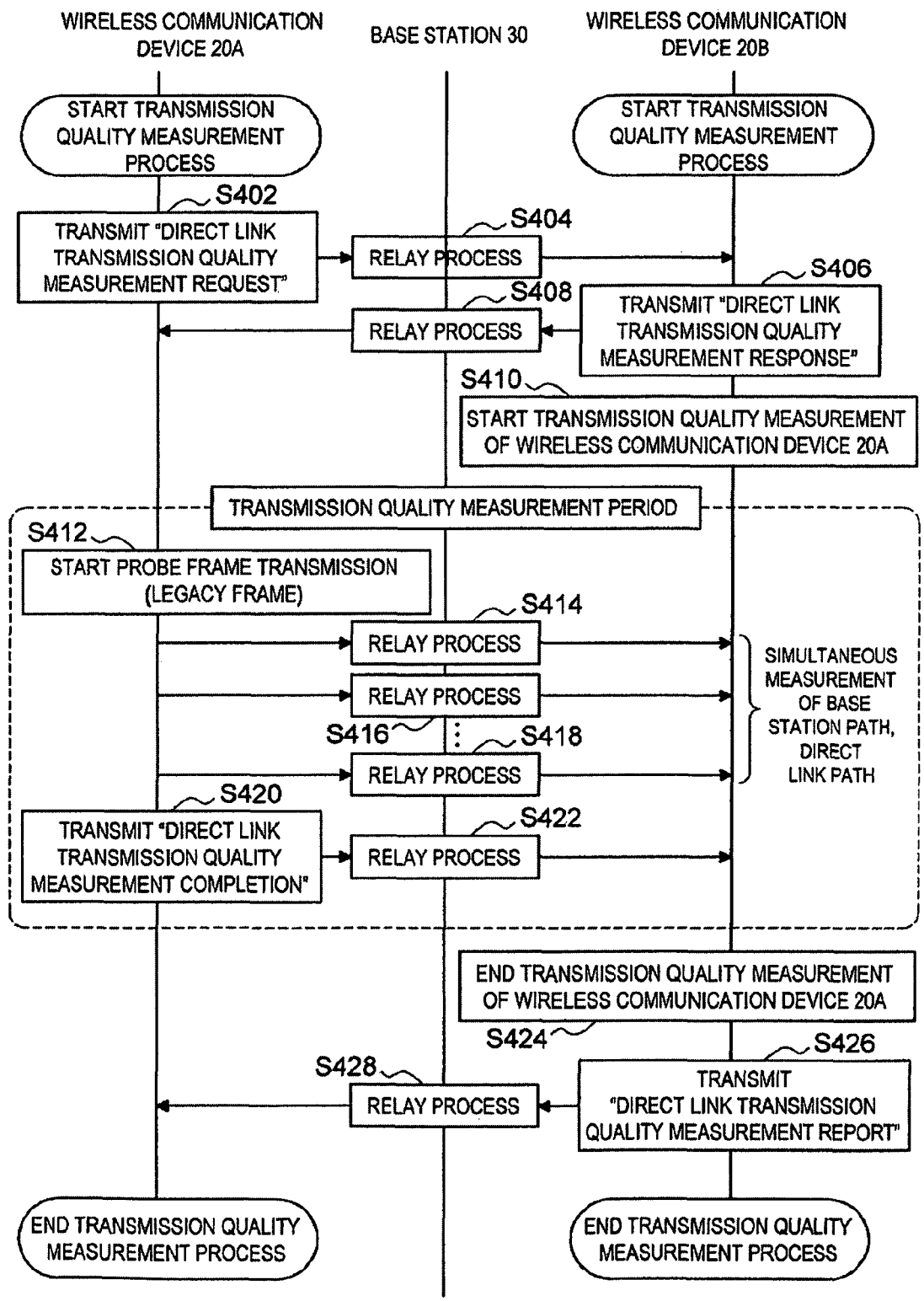

FIG.10

| -BASE STATION PATH | -DIRECT LINK PATH |
|---|---|
| -20 MHz BANDWIDTH<br>  -1Stream...xdB<br>  -2Stream...×<br>  -3Stream...×<br>  -4Stream...×<br>-40 MHz BANDWIDTH<br>  -1Stream...×<br>  -2Stream...×<br>  -3Stream...×<br>  -4Stream...× | -20 MHz BANDWIDTH<br>  -1Stream...xdB<br>  -1Stream(TxBF)...×<br>  -2Stream...×<br>  -2Stream(TxBF)...×<br>  -3Stream...×<br>  -3Stream(TxBF)...×<br>  -4Stream...×<br>-40 MHz BANDWIDTH<br>  -1Stream...×<br>  -1Stream(TxBF)...×<br>  -2Stream...×<br>  -2Stream(TxBF)...×<br>  -3Stream...×<br>  -3Stream(TxBF)...×<br>  -4Stream...× |

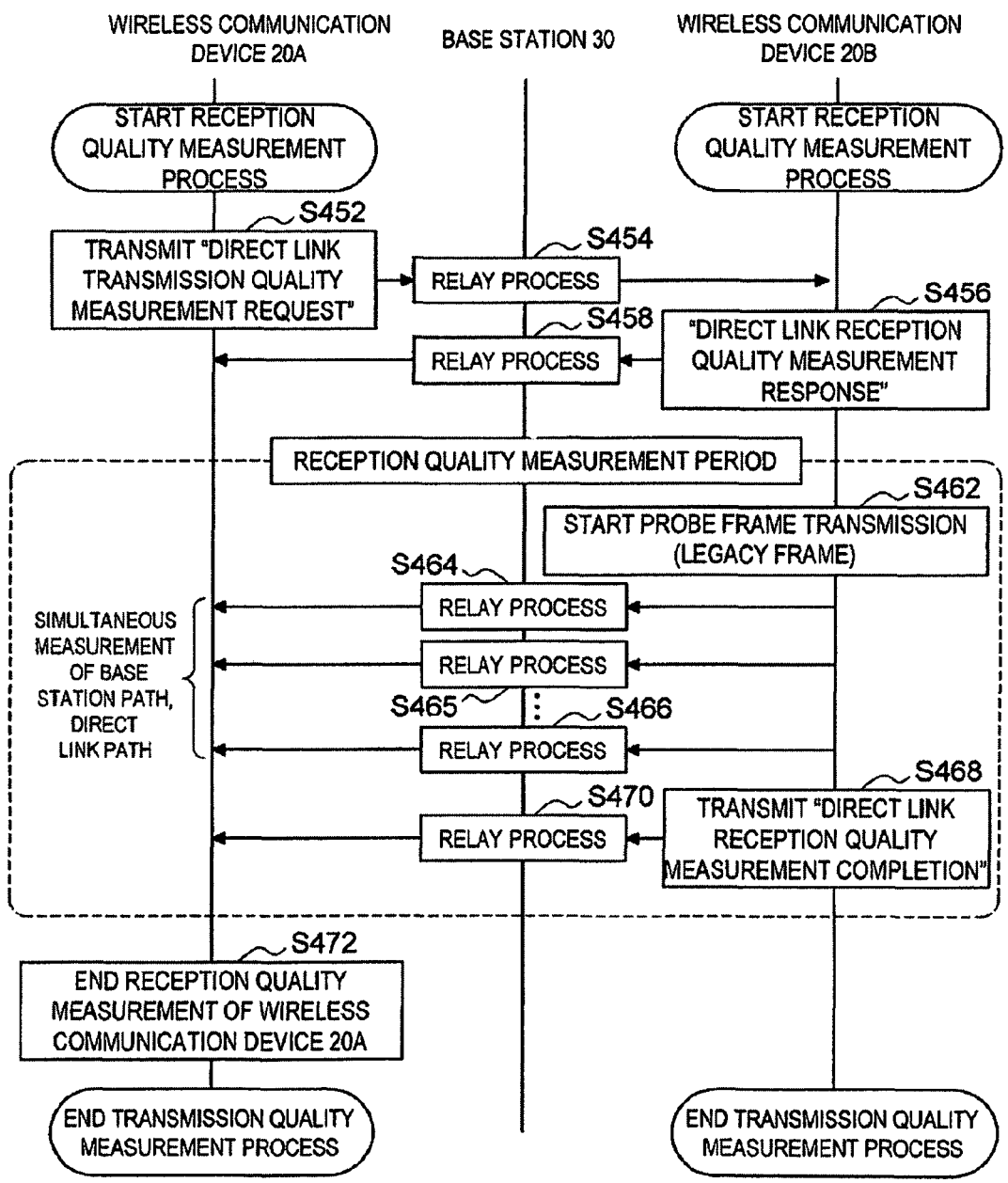

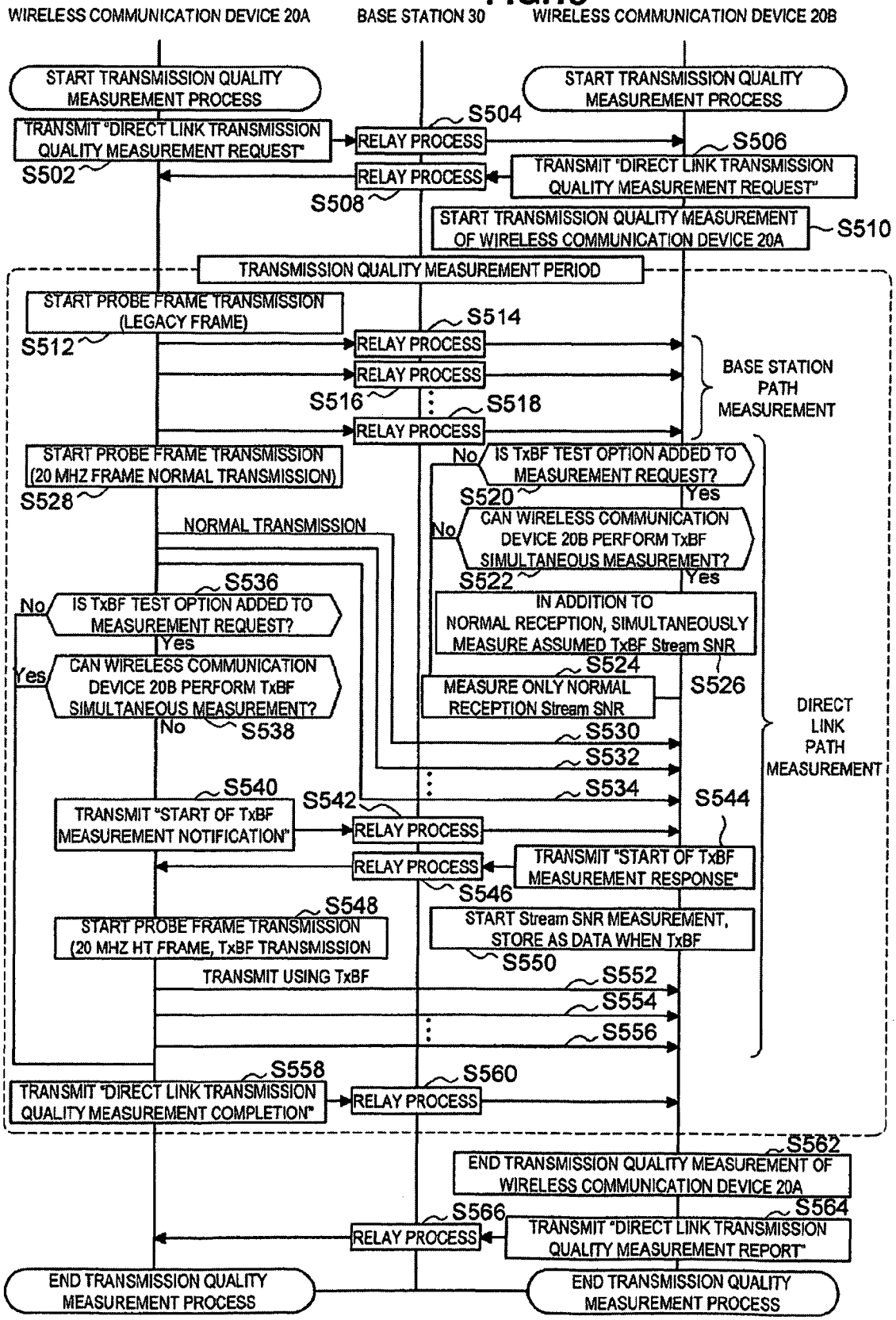

FIG.14

| -BASE STATION PATH | -DIRECT LINK PATH |
|---|---|
| -20 MHz BANDWIDTH<br>  -1Stream...xdB<br>  -2Stream...×<br>  -3Stream...×<br>  -4Stream...×<br>-40 MHz BANDWIDTH<br>  -1Stream...×<br>  -2Stream...×<br>  -3Stream...×<br>  -4Stream...× | -20 MHz BANDWIDTH<br>  -1Stream...xdB<br>  -1Stream(TxBF)...xdB<br>  -2Stream...xdB,xdB<br>  -2Stream(TxBF)...xdB,xdB<br>  -3Stream...xdB,xdB,xdB<br>  -3Stream(TxBF)...xdB,xdB,xdB<br>  -4Stream...×<br>-40 MHz BANDWIDTH<br>  -1Stream...×<br>  -1Stream(TxBF)...×<br>  -2Stream...×<br>  -2Stream(TxBF)...×<br>  -3Stream...×<br>  -3Stream(TxBF)...×<br>  -4Stream...× |

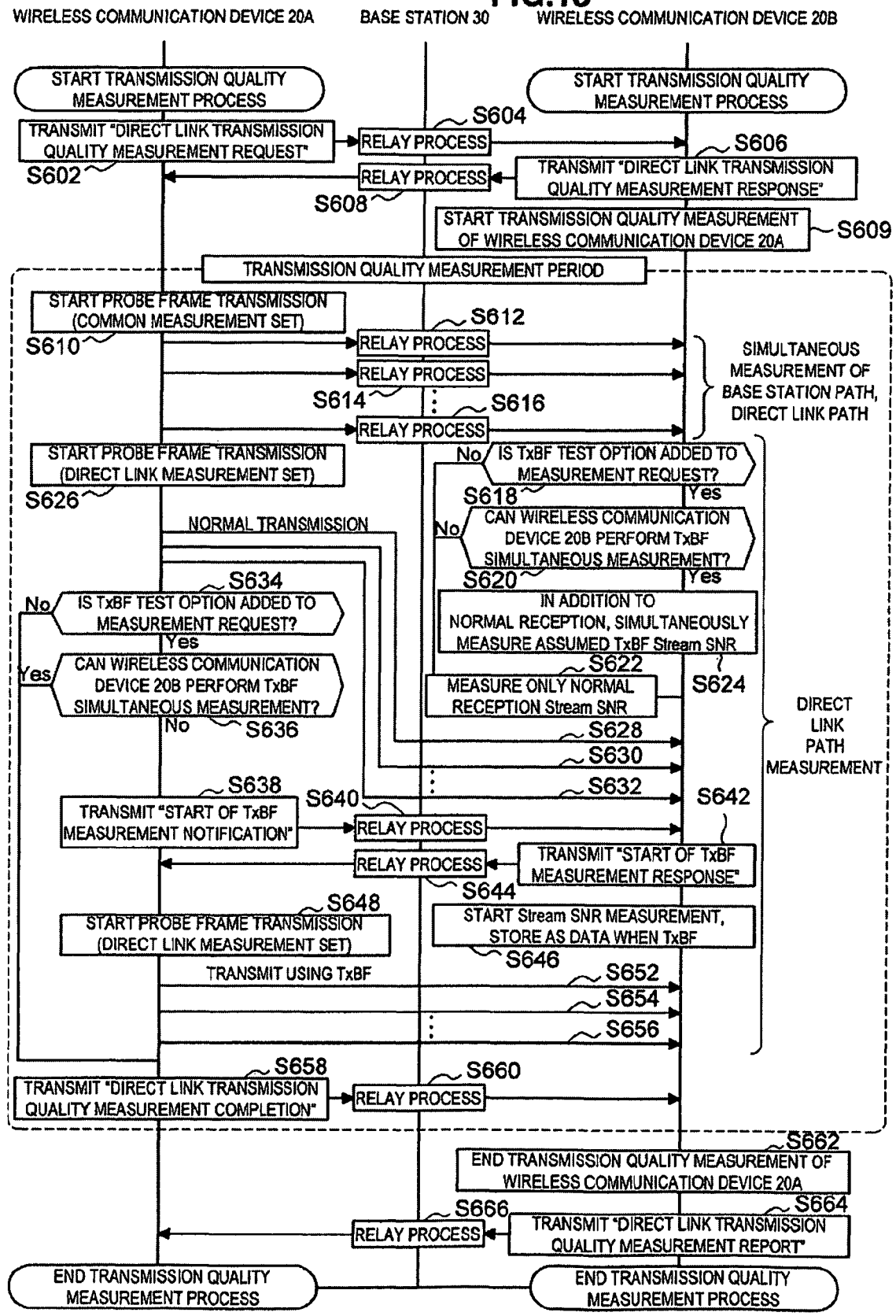

WIRELESS COMMUNICATION SYSTEM, WIRELESS COMMUNICATION DEVICE, WIRELESS COMMUNICATION METHOD, AND PROGRAM

CROSS REFERENCES TO RELATED APPLICATION(S)

The present invention contains subject matter related to Japanese Patent Application JP 2007-334206 filed in the Japan Patent Office on Dec. 26, 2007, the entire contents of which being incorporated herein by reference.

BACKGROUND OF THE INVENTION

1. Field of the Invention

The present invention relates to a wireless communication system, a wireless communication device, a wireless communication method, and a program.

2. Description of the Related Art

Recently, local area network (LAN) standards such as IEEE802.11a and IEEE802.11b have been established. These LAN standards define an infrastructure mode and an ad hoc mode. In the infrastructure mode, an access point (base station) adjusts access timing of a plurality of wireless communication devices. In the ad hoc mode, access timing is determined between wireless terminal devices.

The infrastructure mode in which communication is performed via an access point is disadvantageous in that throughput decreases in comparison with the ad-hoc mode, but it is advantageous in that managed wireless communication devices can access a wired LAN and the Internet. In the ad-hoc mode, wireless communication devices directly communicate with each other, and there is therefore no overhead due to access point relay, and throughput increases. However, the ad-hoc mode is disadvantageous in that a wired LAN and the Internet cannot be accessed.

As a method to exploit the advantages of both modes, a direct link protocol (DLP) method is defined as an optional function of 802.11e. According to the DLP method, wireless communication devices can directly communicate with each other by setting a direct link (direct communication link) while maintaining the infrastructure mode.

For example, Japanese Patent Application Publication No. JP-A-2003-348103 discloses a technology relating to the DLP method. More specifically, Japanese Patent Application Publication No. JP-A-2003-348 103 discloses a technology in which a wireless communication device confirms, through communication via an access point, whether or not another wireless communication device is compatible with the DLP method. After confirming that the other wireless communication device is compatible with the DLP method, the wireless communication device directly communicates with the other wireless communication device.

SUMMARY OF THE INVENTION

The present invention addresses the problem described above and provides a wireless communication system, a wireless communication device, a wireless communication method, and a program that are new and improved and that can appropriately determine whether to perform one of direct communication and communication via a base station.

According to an embodiment of the present invention, there is provided a wireless communication system that includes a first wireless communication device, a second wireless communication device, and a base station that relays wireless communication between the first and the second wireless communication devices. The first wireless communication device and the second wireless communication device perform one of indirect communication via the base station and direct communication that does not pass via the base station. The first wireless communication device obtains a type of communication function with which the second wireless communication device is compatible, and transmits a data frame using at least one of the communication functions with which both the first wireless communication device and the second wireless communication device are compatible. The second wireless communication device measures the communication quality of the data frame transmitted from the first wireless communication device for each communication function used, and one of the first wireless communication device and the second wireless communication device determines, based on the communication quality, whether to use the indirect communication or the direct communication.

In the above-described configuration, as the first wireless communication device transmits a data frame using at least one of the communication functions with which the first wireless communication device and the second wireless communication device are compatible, the second wireless communication device can measure the communication quality of the data frame transmitted by the first wireless communication device for each communication function used. As a result, the communication quality of the data frame for each communication function can be obtained, and for example, the highest quality communication function for the indirect communication and the highest quality communication function for the direct communication can be compared and communication offering the very highest communication quality can be performed.

The first wireless communication device may transmit a data frame to the base station using a communication function with which the first wireless communication device, the second wireless communication device and the base station are compatible, and the base station may transmit the data frame received from the first wireless communication device to the second wireless communication device. The second wireless communication device may measure the communication quality of both the data frame received from the first wireless communication device and the data frame received from the base station.

In the above-described configuration, when the first wireless communication device transmits a data frame using a communication function with which the three devices (namely, the first wireless communication device, the second wireless communication device and the base station) are compatible, the second wireless communication device, in addition to the data frame transmitted from the base station, can receive the data frame transmitted from the first wireless communication device, and can measure the signal quality of both the data frames. Therefore, if the first wireless communication device transmits a data frame via the base station using a communication function with which all three of the above-described devices are compatible, the signal quality of the indirect communication and the direct communication data frames can be measured. As a result, a transmission processing load on the first wireless communication device can be reduced. In addition, the amount of traffic can be reduced, leading to effective use of a bandwidth.

The first wireless communication device may also transmit a data frame directly to the second wireless communication device using a communication function with which the first wireless communication device and the second wireless communication device are compatible, but with which the base station is not compatible. In this configuration, the second wireless communication device can measure the communication quality of the data frame transmitted using a communication function with which not all three of the above-described devices are compatible, but with which two devices, namely the first wireless communication device and the second wireless communication device, are compatible.

The first wireless communication device may also transmit a data frame to the base station using a communication function with which the first wireless communication device, the second wireless communication device and the base station are compatible, and may also transmit a data frame directly to the second wireless communication device using a communication function with which the first wireless communication device and the second wireless communication device are compatible. The base station may transmit the data frame received from the first wireless communication device to the second wireless communication device, and the second wireless communication device may sequentially measure the communication quality of the data frame received from the base station and the data frame received from the first wireless communication device. In this configuration, even if the second wireless communication device cannot receive the data frame transmitted from the first wireless communication device via the base station directly from the first wireless communication device, the signal quality of both the data frame transmitted from the first wireless communication device and the data frame transmitted from the base station can be measured.

The second wireless communication device may transmit the measured communication quality to the first wireless communication device, and, based on the communication quality received from the second wireless communication device, the first wireless communication device may determine whether to use the indirect communication or the direct communication.

The second wireless communication device may measure the quality of each stream obtained by separating the communication channel, as communication quality.

The communication quality measured by the second wireless communication device may be intermittently performed after communication is established between the first wireless communication device and the second wireless communication device.

The first wireless communication device may, after notifying the second wireless communication device of a data frame transmission using a beam forming function, start transmission of a data frame using the beam forming function.

According to another embodiment of the present invention, there is provided a wireless communication device that performs one of indirect communication with another wireless communication device via a base station and direct communication with the other wireless communication device without passing via the base station. The wireless communication device includes an acquisition portion that obtains a type of communication function with which the other wireless communication device is compatible, a selection portion that, based on the communication function obtained by the acquisition portion, selects at least one of the communication functions with which both the wireless communication device and the other wireless communication device are compatible, a transmitting portion that transmits a data frame using the communication function selected by the selection portion, and a determination portion that, based on communication quality of the data frame measured by the other wireless communication device for each communication function used, determines whether to perform the indirect communication or the direct communication.

According to another embodiment of the present invention, there is provided a wireless communication device that performs one of indirect communication with another wireless communication device via a base station and direct communication with the other wireless communication device without passing via the base station. The wireless communication device includes a transmitting portion that transmits a communication function with which the wireless communication device is compatible to the other wireless communication device, a receiving portion that receives a data frame transmitted from the other wireless communication device using the communication function with which the wireless communication device and the other wireless communication device are compatible, and a measuring portion that measures the communication quality of the data frame received by the receiving portion for each of the communication functions used. The transmitting portion may transmit the communication quality measured by the measuring portion to the other wireless communication device.

According to another embodiment of the present invention, there is provided a wireless communication method performed in a wireless communication system that includes a first wireless communication device, a second wireless communication device, and a base station that relays wireless communication between the first and the second wireless communication devices. The wireless communication method includes the steps of: acquiring, by the first wireless communication device, a type of communication function with which the second wireless communication device is compatible; transmitting, by the first wireless communication device, a data frame using at least one of the communication functions with which both the first wireless communication device and the second wireless communication device are compatible; measuring, by the second wireless communication device, communication quality of the data frame transmitted from the first wireless communication device for each communication function used; and determining, by one of the first communication device and the second wireless communication device, based on the communication quality, whether to perform one of indirect communication via the base station and the direct communication that does not pass via the base station.

According to another embodiment of the present invention, there is provided a program including instructions that command a computer, that is a wireless communication device that performs one of indirect communication with another wireless communication device via a base station and direct communication with the other wireless communication device that does not pass via the base station, to function as a: selection portion that selects at least one of communication functions with which the first wireless communication device and the second wireless communication device are compatible; a transmitting portion that transmits a data frame using the communication function selected by the selection portion; and a determining portion that determines, based on communication quality of the data frame measured by the second wireless communication device for each communication function used, whether to perform one of the indirect communication and the direct communication.

The above-described program can cause a hardware resource of a computer including, for example, a CPU, a ROM and a RAM to execute the function of the selection portion and determination portion as described above. That is, a computer that uses the program can be caused to function as the above-described control portion.

According to the embodiments of the present invention described above, it can be appropriately determined whether to perform one of direct communication and communication via a base station.

BRIEF DESCRIPTION OF THE DRAWINGS

FIG. 8 is an explanatory diagram that shows a specific example of a "common measurement set" and a "direct link measurement set";

FIG. 9 is a sequence diagram that shows the flow of a transmission quality measurement process according to the first operation example;

FIG. 10 is an explanatory diagram that shows a specific example of a direct link transmission measurement report;

FIG. 11 is a sequence diagram that shows the flow of a reception quality measurement process according to the first operation example;

FIG. 13 is a sequence diagram that shows the flow of a transmission quality measurement process according to a second operation example;

FIG. 14 is an explanatory diagram that shows a specific example of a direct link transmission measurement report;

FIG. 15 is a sequence diagram that shows the flow of a transmission quality measurement process according to a third operation example;

DETAILED DESCRIPTION OF THE PREFERRED EMBODIMENTS

Figure 1:
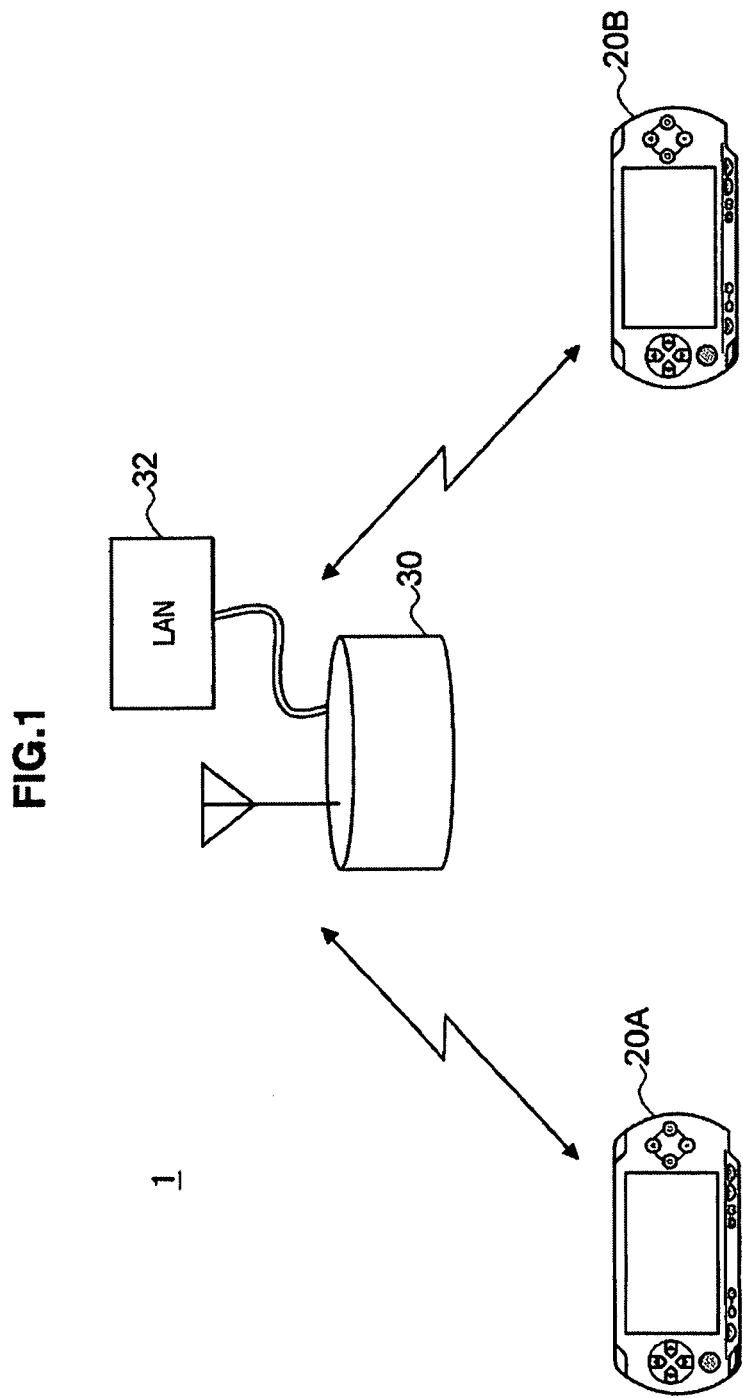
FIG. 1 is an explanatory diagram that shows a configuration of a wireless communication system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The preferred embodiments for the present invention will be explained in the order shown below.

1. Overview of wireless communication system according to the present embodiment
2. Configuration of wireless communication device
3. Operation of the wireless communication system according to the present embodiment
   3-1. First operation example
   3-2. Second operation example
   3-3. Third operation example
   3-4. Fourth operation example
   3-5. Fifth operation example
4. Conclusion 1. Overview of Wireless Communication System According to the Present Embodiment First, an overview of a wireless communication system 1 according to the present embodiment will be explained with reference to FIG. 1.

FIG. 1 is an explanatory diagram that shows a configuration of the wireless communication system 1 according to the present embodiment. As shown in FIG. 1, the wireless communication system 1 includes a wireless communication device 20A, a wireless communication device 20B, a base station 30, and a LAN 32.

The base station 30 manages the wireless communication device 20A and the wireless communication device 20B that are present within a radio wave reachable range of the base station 30. Further, the base station 30 is connected to a LAN 32 as a backbone network such as Ethernet (registered trademark). When the LAN 32 and the wireless communication device 20A or the wireless communication device 20B communicate, the base station 30 relays communication between the LAN 32 and the wireless communication device 20A or the wireless communication device 20B.

Further, the base station 30 controls communication performed by the managed wireless communication device 20A and wireless communication device 20B. For example, the base station 30 periodically transmits a beacon, which is a communication control signal, and the wireless communication device 20A and the wireless communication device 20B receive the beacon, thereby sharing timing in the wireless communication system 1.

In addition, when the base station 30 receives a data frame addressed to the wireless communication device 20B that is transmitted from the wireless communication device 20A, the base station 30 transmits the received data frame to the wireless communication device 20B. More specifically, the address of the wireless communication device 20A is described in a transmitter address (TA) of the data frame addressed to the wireless communication device 20B that is transmitted from the wireless communication device 20A. The address of the base station 30 is described in a receiver address (RA), and the address of the wireless communication device 20B is described in a destination address (DA). When the base station 30 receives the data frame, it changes the RA to the address of the wireless communication device 20B that has been described in the DA, describes in a source address (SA) the address of the wireless communication device 20A that has been described in the TA, changes the TA to the address of the base station 30, and transmits the data frame. Thus, the wireless communication device 20B can receive the data frame in which the address of the own device is described in the RA.

Note that, in FIG. 1, portable game consoles are shown as an example of the wireless communication devices 20A and 20B. However, the wireless communication devices 20A and 20B are not limited to this example. For example, each of the wireless communication devices 20A and 20B may also be an information processing device such as a personal computer (PC), a home video processing device (a DVD recorder, a video deck or the like.), a mobile telephone, a personal handyphone system (PHS), a mobile music playback device, a mobile video processing device, a personal digital assistant (PDA), a home game console, a household electrical appliance or the like. Further, the data frame transmitted or received by the wireless communication device 20 may include audio data such as music, a lecture, a radio program or the like, visual data such as a motion picture, a television program, a video program, a photograph, a document, a painting, a diagram or the like, and any other type of data such as a game, software or the like. Note that, in FIG. 1, in order to distinguish the respective wireless communication devices, an alphabet capital letter is added after each reference numeral like the wireless communication devices 20A and 20B. However, when there is no need to particularly distinguish the respective wireless communication devices, they are collectively referred to as the wireless communication devices 20.

In FIG. 1, the wireless communication devices 20A and 20B are shown as the wireless communication devices 20 managed by the single base station 30. However, the single base station 30 may manage three or more wireless communication devices 20. Further, the LAN 32 is shown as an example of a communication network in FIG. 1. Examples of the communication network include a leased line network such as a wide area network (WAN), an internet protocol-virtual private network (IP-VPN), and the like.

In the above-described wireless communication system 1, in addition to wireless communication via the base station 30, the wireless communication devices 20A and 20B can directly communicate with each other by setting a direct link. Also, if the wireless communication devices 20A and 20B are high throughput (HT) compatible, the wireless communication devices 20A and 20B can perform direct communication using multiple-input multiple-output (MIMO). Hereinafter, the MIMO function will be briefly described with reference to FIG. 2.

Figure 2:
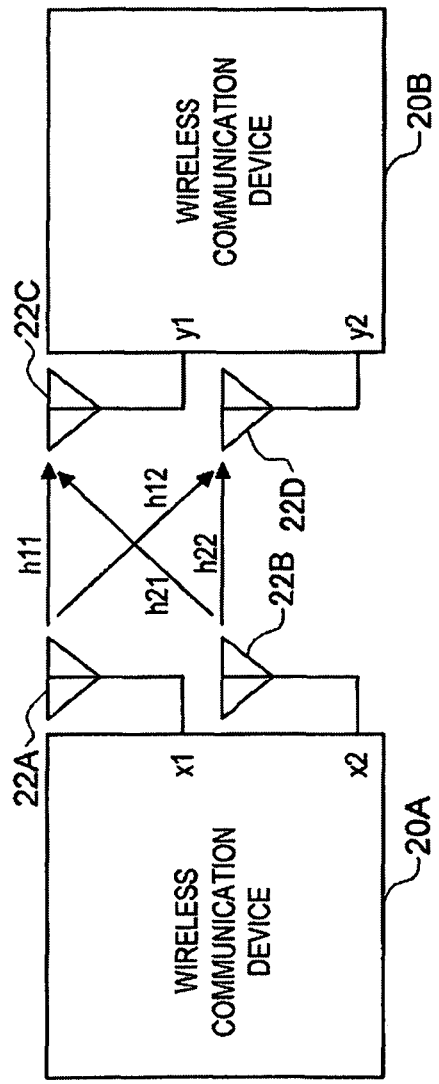
FIG. 2 is an explanatory diagram that shows communication using MIMO.

FIG. 2 is a sequence diagram that shows communication using MIMO. A signal transmitted from an antenna 22A of the wireless communication device 20A is x 1, a signal transmitted from an antenna 22B is x 2, while a signal received by an antenna 22C of the wireless communication device 20B is y 1 and a signal received by an antenna 22D is y 2. Further, the transmission path characteristic between the antenna 22A and the antenna 22C is h 11, the transmission path characteristic between the antenna 22A and the antenna 22D is h 12, the transmission path characteristic between the antenna 22B and the antenna 22C is h 21, and the transmission path characteristic between the antenna 22B and the antenna 22D is h 22. In this case, the relationships between the signals transmitted from the wireless communication device 20A and the signals received by the wireless communication device 20B can be expressed using Formula 1 below.

Formula 1

$$\begin{pmatrix} y1 \\ y2 \end{pmatrix} = \begin{pmatrix} h11 & h21 \\ h12 & h22 \end{pmatrix} \begin{pmatrix} x1 \\ x2 \end{pmatrix} \quad \text{(Formula 1)}$$

In the present specification, the first expression on the right of the Formula 1 is sometimes called the channel matrix H (the transfer function). By the wireless communication device 20A transmitting a known signal in advance of transmitting the signals x 1 and x 2, the channel matrix H can be calculated in the wireless communication device 20B.

Here, the diagonal elements of the channel matrix H (h 21, h 12) are known as crosstalk elements, and are noise in relation to the signals that are wished to be transmitted.

When the wireless communication device 20B calculates the channel matrix H it uses an inverse matrix of the channel matrix H to eliminate the crosstalk elements, and can estimate the signal transmitted from the antenna 22A to be x 1 and the signal transmitted from the antenna 22B to be x 2. The strength of the respective signals after this analysis and restoration operation is hereinafter referred to as the "stream SNR."

Transmit beamforming (TxBF) is a technology that allows harmonization and the elimination of crosstalk elements on the transmission side as well as the reception side to further improve the stream SNR after signal separation on the reception side. By multiplying and transmitting a steering matrix Q relating to the signal x 1 and the signal x 2, the wireless communication device 20A can change the form of an equivalent channel matrix H' on the wireless communication device 20B, which is the reception side, to a form more suited to analysis. An example of the steering matrix could be a unitary matrix obtained by singular value decomposition of the channel matrix H.

Formula 2

$$\begin{pmatrix} y1 \\ y2 \end{pmatrix} = \begin{pmatrix} h11 & h21 \\ h12 & h22 \end{pmatrix} \times \begin{pmatrix} q11 & q21 \\ q12 & q22 \end{pmatrix} \times \begin{pmatrix} x1 \\ x2 \end{pmatrix} \quad \text{(Formula 2)}$$
$$= \begin{pmatrix} h'11 & h'21 \\ h'12 & h'22 \end{pmatrix} \times \begin{pmatrix} x1 \\ x2 \end{pmatrix}$$

The wireless communication devices 20A and 20B can calculate the steering matrix based on the channel matrix H. Therefore, even if the wireless communication device 20A transmits signals without using TxBF, if the steering matrix calculation formula is shared, the wireless communication device 20B can estimate the stream SNR if TxBF is/had been used.

This type of MIMO function is effective in improving the transmission rate in proportion to the number of antennas without widening the frequency bandwidth being used. In the example shown in FIG. 2, the wireless communication devices 20A and 20B are provided with 2 antennas respectively, but the wireless communication devices 20A and 20B may be provided with 3 or more antennas.

Next, the flow until the wireless communication devices 20A and 20B set a direct link will be briefly described with reference to FIG. 3.

Figure 3:
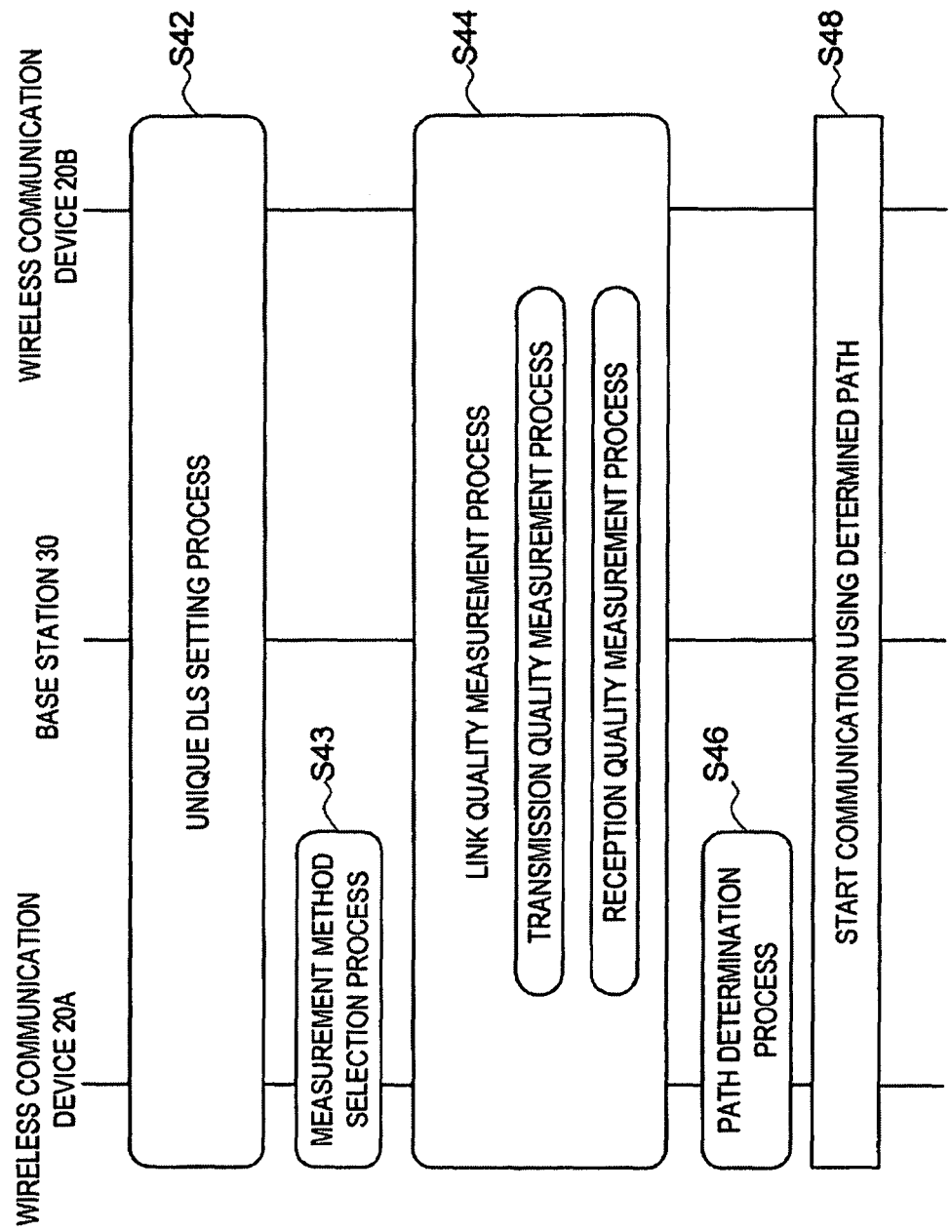
FIG. 3 is a sequence diagram that shows the flow until a plurality of communication devices set a direct link.

FIG. 3 is a sequence diagram that shows the flow until a plurality of communication devices 20 set a direct link. First, when the wireless communication devices 20A and 20B are operating normally in an infrastructure mode, the wireless communication device 20A, the base station 30 and the wireless communication device 20B perform a unique DLS setting process (step S42). The unique DLS setting process is a series of frame exchange operations in which the wireless communication devices 20A and 20B transmit, receive and share information about their communication functions, capabilities and the like.

Following that, based on, for example, the capabilities of the wireless communication device 20B obtained in the unique DLS setting process, the wireless communication device 20A performs a measurement method selection process to select which measurement method to use to perform a direct link quality measurement process (step S43). Then, the wireless communication device 20A, the base station 30 and the wireless communication device 20B perform the link quality measurement process (step S44). The link quality measurement process is a series of operations for obtaining information about a link quality of a direct link path between the wireless communication devices 20A and 20B, and about a link quality of a base station path between the wireless communication devices 20A and 20B via the base station 30. Further, the link quality measurement process includes a transmission quality measurement process to measure the quality of the communication path from the wireless communication device 20A to the wireless communication device 20B, and a reception quality measurement process to measure the quality of the communication path from the wireless communication device 20B to the wireless communication device 20A.

The wireless communication device 20A then performs a path determination process (step S46) based on the transmission quality and the reception quality obtained in the link quality measurement process. The path determination process is an operation to judge and determine which communication path, of the direct link path and the base station path, should be used for communication between the wireless communication devices 20A and 20B. The wireless communication device 20A further determines what type of communication function to use on the determined communication path. The wireless communication device 20A and the wireless communication device 20B then start communication using the communication path determined in the path determination process and the communication function (step S48).

2. Configuration of Wireless Communication Device

Hereinabove, the wireless communication system 1 according to the present embodiment is outlined with reference to FIG. 1 to FIG. 3. Next, a configuration of the wireless communication device 20 included in the wireless communication system 1 according to the present embodiment will be described with reference to FIG. 4.

Figure 4:
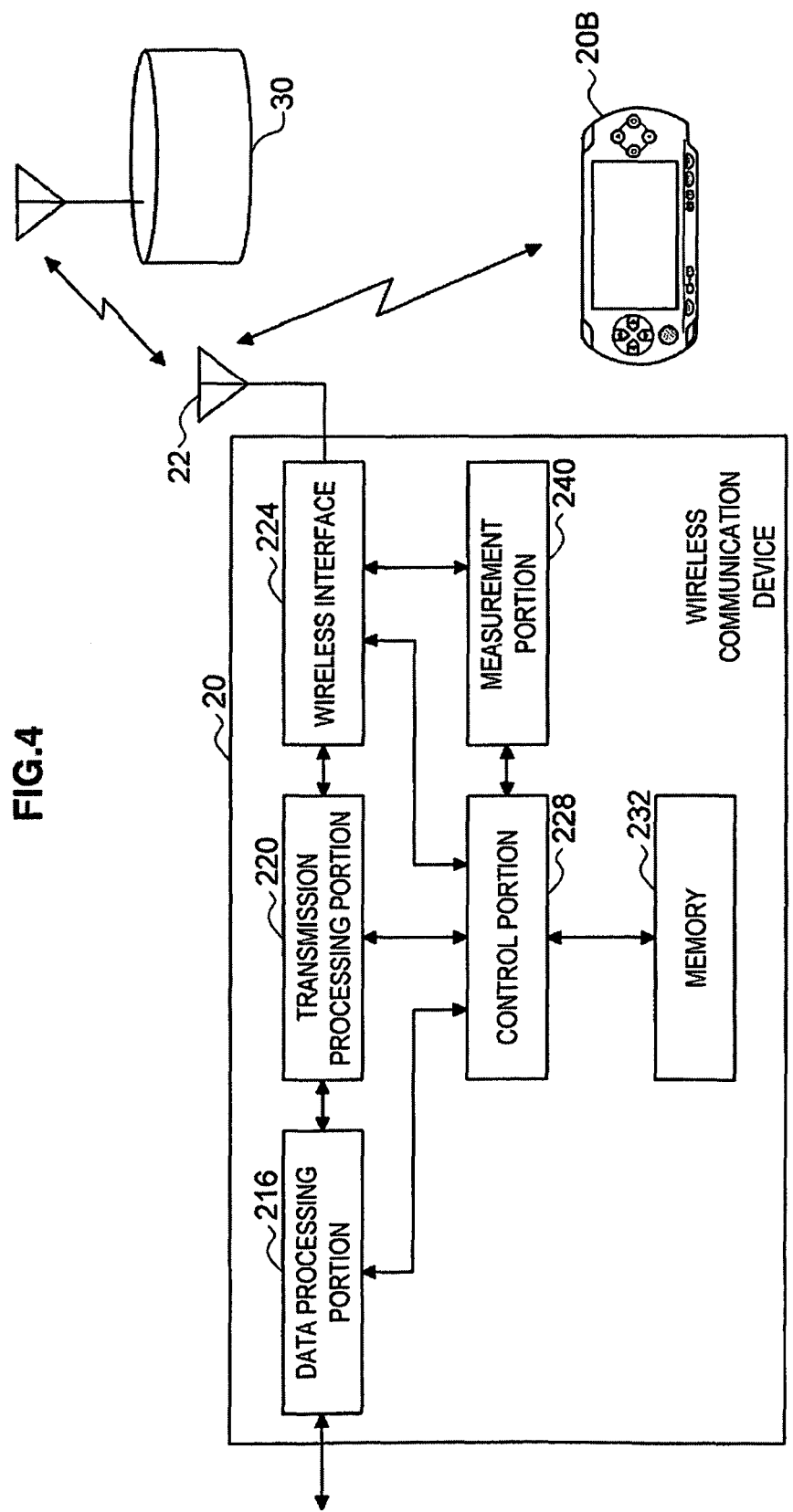
FIG. 4 is an explanatory diagram that shows a configuration of a wireless communication device according to the embodiment.

FIG. 4 is an explanatory diagram that shows the configuration of the wireless communication device 20 according to the present embodiment. As shown in FIG. 4, the wireless communication device 20 includes an antenna 22, a data processing portion 216, a transmission processing portion 220, a wireless interface 224, a control portion 228, and a measurement portion 240.

In transmission, the data processing portion 216 generates various types of data frames according to request from, for example, a higher-level layer and supplies them to the transmission processing portion 220. Further, in reception, the data processing portion 216 processes and analyses the various types of data frames supplied from the transmission processing portion 220. Examples of the various types of data frames include: a management frame such as an association request, an association response, a probe request, a probe response, an authentication request, a deauthentication request, a reserve request and the like; a control frame such as request to send (RTS), clear to send (CTS), acknowledgment (ACK) and the like; and an arbitrary frame such as a frame including actual data.

In transmission, the transmission processing portion 220 adds a header and an error detection code, such as a frame check sequence (FCS), to the various types of data frames supplied from the data processing portion 216, and supplies the data frames to the wireless interface 224. Further, in reception, the transmission processing portion 220 analyses the header added to each of the various types of data frames supplied from the wireless interface 224. When the transmission processing portion 220 confirms that there is no error in each data frame based on the error detection code, it supplies the various types of data frames to the data processing portion 216. Note that the header may include frame control information, duration, TA, RA, SA, DA, sequence control information, and the like.

In transmission, the wireless interface 224 generates a modulation signal in a frequency band of a carrier wave based on the various types of data frames supplied from the transmission processing portion 220, and allows the antenna 22 to transmit the modulation signal as a wireless signal. Further, in reception, the wireless interface 224 decodes the various types of data frames, by down-converting the wireless signal received by the antenna 22 and converting it to a bit sequence. That is, the wireless interface 224 can serve as a transmitting portion and a receiving portion by cooperating with the antenna 22. Note that, although the single antenna 22 is shown in FIG. 3, the wireless communication device 20 may include a plurality of the antennas 22 and may have a multiple input multiple output (MIMO) function.

The control portion 228 controls various operations, such as a reception operation and a transmission operation, of the wireless communication device 20. Further, as described later, the control portion 228 has a function as a determination portion that determines, in the unique DLS setting process, whether or not the wireless communication device 20B is compatible with the unique DLS setting, a function to perform the measurement method selection process, a function to perform the path determination process and the like. In other words, the control portion 228 works in coordination with other components and functions as an acquisition portion, a selection portion and a determination portion.

The memory 232 serves as a data processing working area used by the control portion 228, and has a function as a storage medium storing various types of data. For example, the memory 232 may be a storage medium such as: a non-volatile memory such as an electrically erasable programmable read only memory (EEPROM), an erasable programmable read only memory (EPROM) or the like; a magnetic disk such as a hard disk, a disc-shaped magnetic disk or the like; an optical disk such as a compact disc recordable (CD-R)/rewritable (RW), a digital versatile disc recordable (DVD-R)/RW/+R/+RW/a random access memory (RAM), a blu-ray disc (BD) (registered trade mark) –R/BD-RE; and a magneto optical (MO) disk.

In the link quality measurement process, the measurement portion 240 measures the link quality of a data frame received from the wireless communication device 20B via the direct link path, and the link quality of a data frame received via the base station path. The link quality measured by the measurement portion 240 may be stored in the memory 232. Note that the link quality measured by the measurement portion 240 may be a received channel power indicator (RCPI) defined by IEEE802.11k, or may be a received signal strength indication (RSSI).

When the measurement portion 240 measures the RCPI as a link quality, there are cases when the TA (the address of the transmitter device) of a measurement target data frame can be limited to a specific TA. For example, when the wireless communication device 20B transmits a data frame to the wireless communication device 20 via the base station 30, the measurement portion 240 may measure the RCPI of a data frame whose TA is the address of the wireless communication device 20B that is transmitted from the wireless communication device 20B to the base station 30, in addition to the RCPI of a data frame whose TA is the address of the base station 30 that is transmitted from the base station 30.

Further, when data frames are transmitted using MIMO, the measurement portion 240 measures the SNR for each stream. If data frames are transmitted without using TxBF, in addition to the SNR for each of those data frame streams, the measurement portion 240 may further measure and estimate the SNR for each of the data frame streams that can be assumed when TxBF is implemented.

3. Operation of the Wireless Communication System According to the Present Embodiment Next, an operation of the wireless communication system 1 according to the present embodiment will be described using first to fifth operation examples as specific examples.

3-1. First Operation Example

First, a first operation example of the wireless communication system 1 according to the present embodiment will be described with reference to FIG. 5 to FIG. 12.

Unique DLS Setting Process

Figure 5:
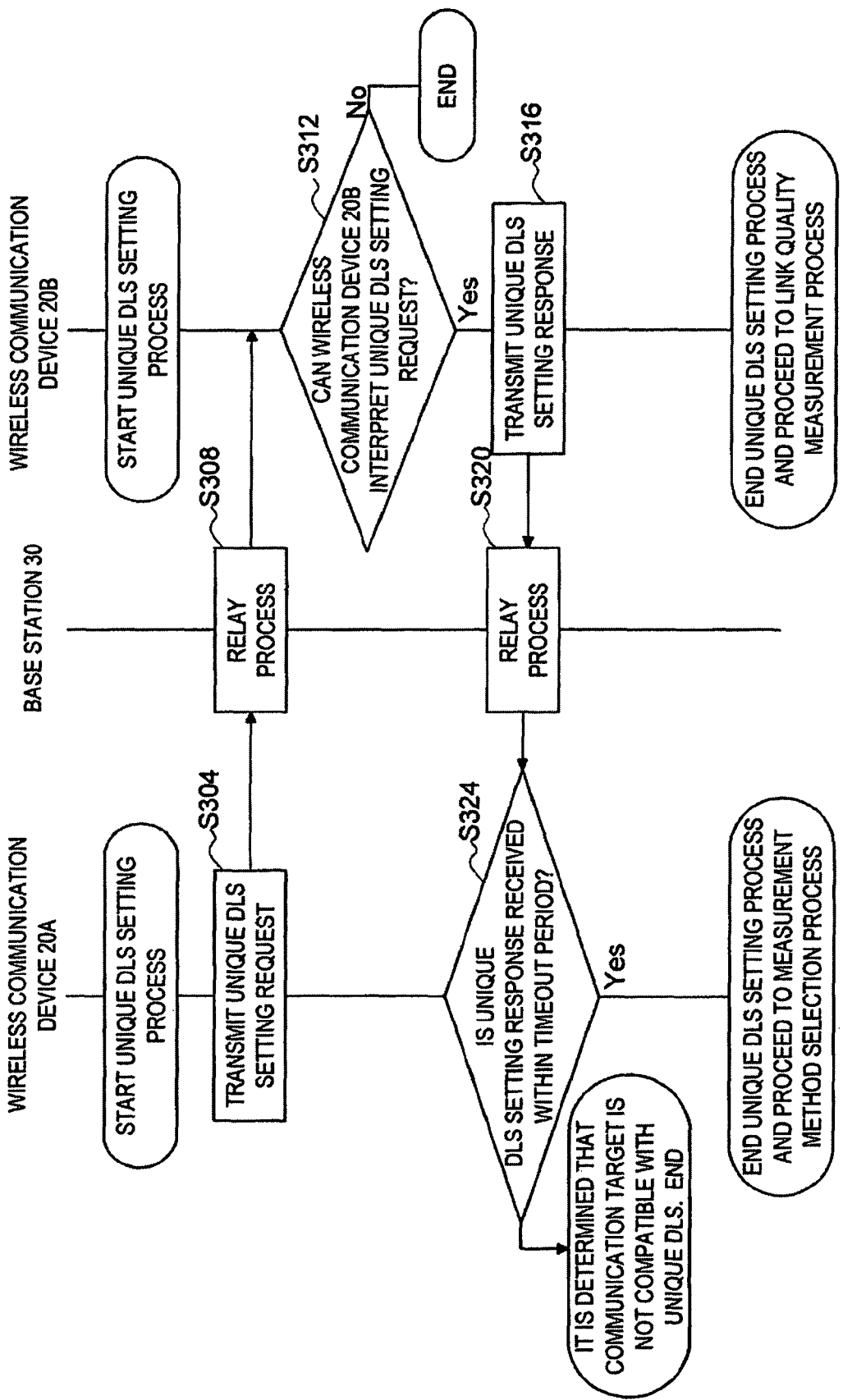
FIG. 5 is a sequence diagram that shows the flow of a unique direct link setup (DLS) setting process.

FIG. 5 is a sequence diagram that shows the flow of the unique DLS setting process. When a start trigger occurs, the wireless communication device 20A proceeds to the unique DLS setting process. Although a specific content of the start trigger is not particularly limited, a timing when the machine (MAC) address of the communication target (the wireless communication device 20B) is obtained corresponds to the start trigger.

Further, if the wireless communication devices 20A and 20B are compatible with a digital living network alliance (DLNA), device detection using a universal plug and play (UPnP) protocol, or occurrence of packet transmission/reception for service detection (SSDP M-SEARCH Req/Res packet, SSDP NOTIFY packet, HTTP get Req packet) can correspond to the start trigger. Thus, the device/service detection and the direct link setting can be performed at the same time. In addition, by setting such a condition, setup can be performed efficiently only with a device that requires the direct link setting.

Then, the wireless communication device 20A transmits a "unique DLS setting request" to the wireless communication device 20B (S304). More specifically, the unique DLS setting request frame is capsulated as a specific Ethertype data frame for the unique DLS. Hereinafter, in the present invention, the "data frame that is capsulated as a specific Ethertype for the unique DLS" is referred to as a "dedicated relay data frame". Here, a frame configuration of a data frame will be described with reference to FIG. 6.

Figure 6:
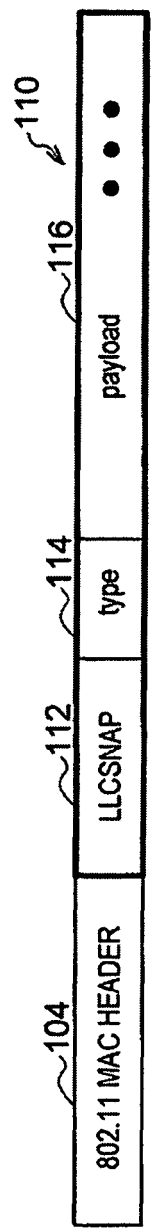
FIG. 6 is an explanatory diagram that shows an example of a frame configuration of a data frame.

FIG. 6 is an explanatory diagram that shows an example of a frame configuration of a data frame. As shown in FIG. 6, the data frame includes an 802.11 MAC header 104, a MAC service data unit (MSDU) 110. The 802.11 MAC header 104 includes a TA indicating the transmitter address of the data frame, an RA indicating the receiver address of the data frame, and the like. For example, when the wireless communication device 20A transmits a data frame to the wireless communication device 20B via the base station 30, the 802.11 MAC header 104 includes the TA in which the address of the wireless communication device 20A is described, and the RA in which the address of the base station 30 is described, and the DA in which the address of the wireless communication device 20B is described.

The MSDU 110 includes a logical link control sub-network access protocol (LLCSNAP) 112, a type 114, and a payload 116.

The LLCSNAP 112 is an 8 byte fixed pattern, and is provided for logical link control. The type 114 is information indicating a frame type of the data frame. For example, 2 byte information indicating that the data frame is a dedicated relay data frame is described in the type 114 of the dedicated relay data frame. Further, a message for direct link setting is described in the payload 116 of the dedicated relay data frame.

Here, the flow of the unique DLS setting process will be described again with reference to FIG. 5. When the wireless communication device 20A transmits a "unique DLS setting request", the base station 30 receives the "unique DLS setting request". The "unique DLS setting request" includes an ID indicating that the content of the frame is the "unique DLS setting request", MAC addresses of the wireless communication devices 20A and 20B, BSSID, capability information of the wireless communication device 20A, and the like. The base station 30 that has received such a "unique DLS setting request" relays the "unique DLS setting request" to the wireless communication device 20B without regard to the content of the "unique DLS setting request" (S308).

When the wireless communication device 20B receives the "unique DLS setting request" from the wireless communication device 20A via the base station 30, it interprets the content of the "unique DLS setting request" from the Ethertype. When the wireless communication device 20B itself is compatible with the unique DLS and it can interpret the content of the "unique DLS setting request" (S312), the wireless communication device 20B transmits a "unique DLS setting response" to the wireless communication device 20A (S316). Like the "unique DLS setting request", the "unique DLS setting response" also includes an ID indicating that the content of the frame is the "unique DLS setting response", MAC addresses of the wireless communication devices 20A and 20B, BSSID, capability information of the wireless communication device 20B, success and failure information, and the like. Note that when the wireless communication device 20B is not compatible with the unique DLS, the "unique DLS setting request" is treated as an unknown Ethertype frame. Therefore, the wireless communication device 20B cannot interpret the content of the frame, and the frame is cleared in the wireless communication device 20B.

When the base station 30 receives the "unique DLS setting response" transmitted from the wireless communication device 20B, it relays the "unique DLS setting response" to the wireless communication device 20A without regard to the content of the "unique DLS setting response" (S320). When the wireless communication device 20A receives the "unique DLS setting response" from the wireless communication device 20B via the base station 30, it interprets the content thereof from the Ethertype (S324). When success and failure information of the "unique DLS setting response" indicates "success", the control portion 228 completes the setting of the unique DLS. Information about the capabilities of the wireless communication device 20B is also held in the memory 232. On the other hand, when the wireless communication device 20A cannot receive the "unique DLS setting response" within a timeout period, the control portion 228 determines that the wireless communication device 20B is not compatible with the unique DLS, and a direct link is not established. When the setting of the unique DLS is completed, the wireless communication device 20A and the wireless communication device 20B proceed to the measurement method selection process.

Measurement Method Selection Process

Figure 7:
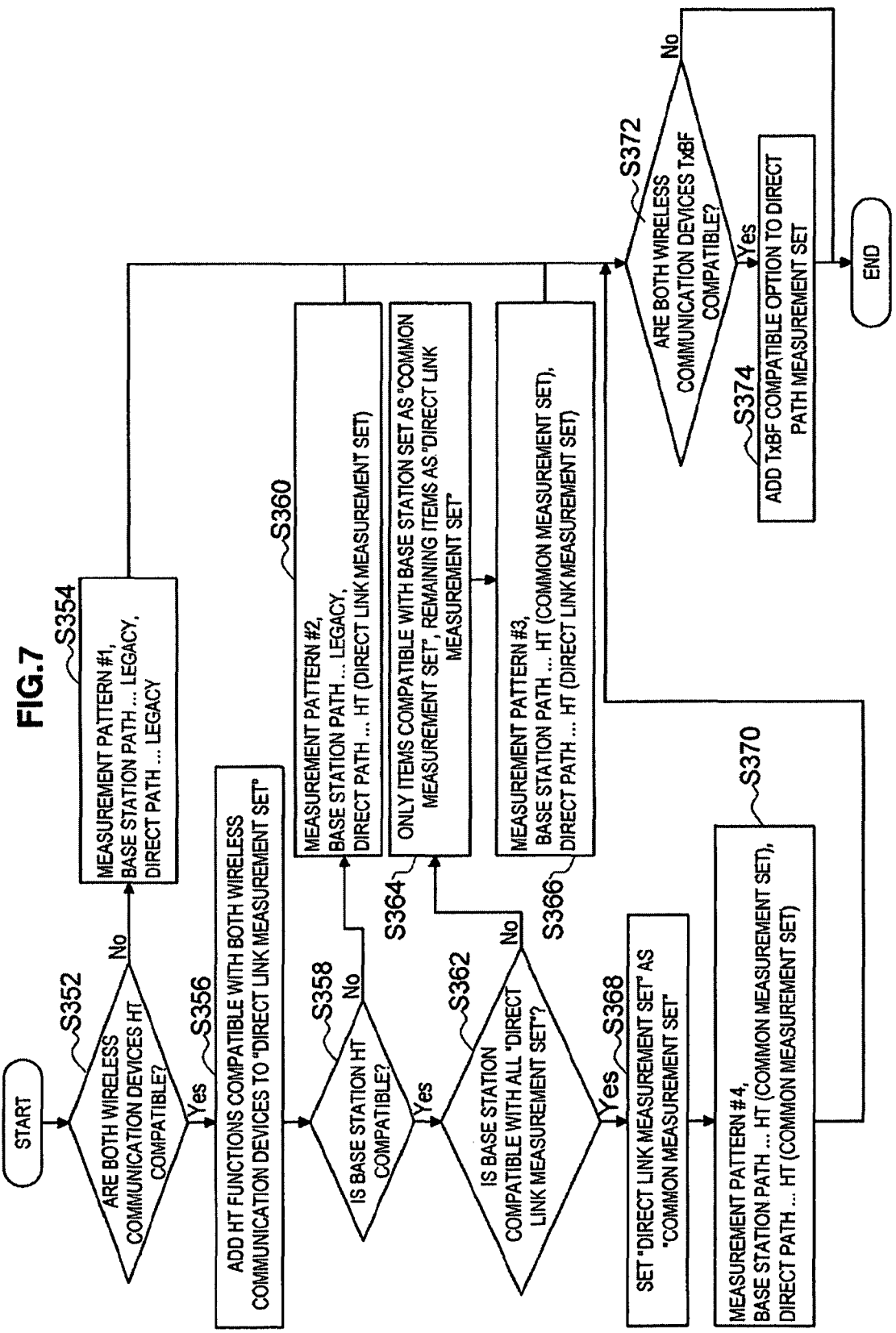
FIG. 7 is a flow chart that shows the flow of a measurement method selection process according to a first operation example.

FIG. 7 is a flow chart that shows the flow of the measurement method selection process according to the first operation example. As shown in FIG. 7, the control portion 228 of the wireless communication device 20A refers to information about the capabilities of the wireless communication device 20B stored in the memory 232, and determines whether or not both the wireless communication device 20A and the wireless communication device 20B are HT compatible (step S352). Then, if the control portion 228 determines that both the wireless communication devices 20A and 20B are not HT compatible, it sets Legacy for both the base station path and the direct path as a measurement pattern #1 (step S354).

On the other hand, if the control portion 228 determines that both the wireless communication devices 20A and 20B are HT compatible, it adds the HT functions with which both the wireless communication devices 20A and 20B are compatible to a "direct link measurement set" (step S356). For example, the number of streams for the modulation and coding set (MCS) and the bandwidths (20 MHz, 40 MHz) with which both the wireless communication devices 20A and 20B are compatible are added to the "direct link measurement set."

Next, the control portion 228 determines whether or not the base station 30 is HT compatible (step S358). Then, if the control portion 228 determines that the base station 30 is not HT compatible, it sets Legacy for the base station path and the above-mentioned "direct link measurement set" for the direct path as a measurement pattern #2 (step S360).

On the other hand, if the control portion 228 determines that the base station 30 is HT compatible, it further determines whether or not the base station 30 is compatible with all of the "direct link measurement set" (step S362). If the control portion 228 determines that the base station 30 is not compatible with all of the "direct link measurement set," it sets only the items of the "direct link measurement set" with which the base station is compatible as a "common measurement set." Further, the control portion 228 sets the items of the "direct link measurement set" that are not included in the "common measurement set" as a new "direct link measurement set" (step S364). The control portion 228 then sets the above-mentioned "common measurement set" (HT) for the base station path and the above-mentioned new "direct link measurement set" (HT) for the direct path, as a measurement pattern #3 (step S366).

If the control portion 228 determines in step S362 that the base station 30 is compatible with all of the "direct link measurement set," it sets the "direct link measurement set" as the "common measurement set" (step S370).

Then, after steps S354, S360, S366 and S370, the control portion 228 determines whether or not both the wireless communication devices 20A and 20B are TxBF compatible (step S372). If both the wireless communication devices 20A and 20B are TxBF compatible, TxBF is added as an option to the measurement set for the direct path (step S374). The TxBF option is not added to the common measurement set.

FIG. 8 is an explanatory diagram that shows a specific example of a "common measurement set" and a "direct link measurement set." More specifically, FIG. 8 shows a specific example of the "common measurement set" and the "direct link measurement set" set by the control portion 228 when the wireless communication devices 20A and 20B are compatible with 3 streams, TxBF, and 20 MHz and 40 MHz bandwidths, while the base station 30, although HT compatible, only supports 1 stream and the 20 MHz and 40 MHz bandwidths.

In this case, the control portion 228 sequentially performs the steps S352, S356 and S358 as shown in FIG. 7 and arrives at step S360. Then, in step S360, the control portion 228 sets the measurement items for the common measurement set for the base station path to 1 stream on the 20 MHz and 40 MHz bandwidths, forming the measurement pattern #3 as shown in FIG. 8. Also in step S360, the control portion 228 further sets the measurement items for the direct link measurement on the direct path as up to 3 streams for the 20 MHz and 40 MHz bandwidths, and TxBF, forming the measurement pattern #3 as shown in FIG. 8.

Link quality measurement process: transmission quality.

FIG. 9 is a sequence diagram that shows the flow of the transmission quality measurement process according to the first operation example. In the example shown in FIG. 9, the wireless communication device 20B is not HT compatible, and the measurement pattern #1 is set by the control portion 228.

First, the wireless communication device 20A transmits a "direct link transmission quality measurement request" frame, which is a dedicated relay data frame, to the wireless communication device 20B via the base station 30 (step S402 and step S404). The content of the "direct link transmission quality measurement request" includes the MAC address of the base station 30 (BSSID) and the MAC address of the wireless communication device 20A. The "direct link transmission quality measurement request" also includes the measurement pattern and the list of measurement items selected in the measurement method selection process. More specifically, the "direct link transmission quality measurement request" includes the measurement pattern for the probe frames transmitted by the wireless communication device 20A for the base station path and the direct link path respectively, the list of the number of streams to be measured, the list of the bandwidths to be measured, and the presence or absence of the TxBF measurement option and the like.

When the wireless communication device 20B can receive and interpret the "direct link transmission quality measurement request", it transmits a "direct link transmission quality measurement response", which is a dedicated relay data frame, to the wireless communication device 20A via the base station 30 (step S406 and step S408). The "direct link transmission quality measurement response" includes information about whether or not the requested measurement is possible. Then, the wireless communication device 20B starts the measurement of the transmission quality of the wireless communication device 20A (step S410).

Here, when the wireless communication device 20A transmits a probe frame via the base station 30, the wireless communication device 20B can receive both a probe frame transmitted from the base station 30 and the probe frame transmitted from the wireless communication device 20A. In other words, the wireless communication device 20B can receive a probe frame including the RA in which the address of the wireless communication device 20B is described, and a probe frame in which the address of the base station 30 is described. Alternatively, the wireless communication device 20B can receive a probe frame including the TA in which the address of the base station 30 is described, or a probe frame in which the address of the wireless communication device 20A is described. It is assumed that the wireless communication device 20A has recognized the matter in the unique DLS setting process.

Then, if success and failure information included in the "direct link transmission quality measurement response" indicates "measurable", the wireless communication device 20A starts to transmit a probe frame to cause the wireless communication device 20B to measure the transmission quality (step S412). More specifically, the wireless communication device 20A transmits a Legacy probe frame including the RA in which the address of the base station 30 is described, the TA in which the address of the wireless communication device 20A is described and the DA in which the address of the wireless communication device 20B is described, a specified number of times. The base station 30 changes the RA of each of the probe frames received from the wireless communication device 20A to the address of the wireless communication device 20B, changes the TA to the address of the base station 30, and transmits the probe frames (step S414, step S416 and step S418).

After that, the wireless communication device 20A transmits a "direct link transmission quality measurement completion" frame, which is a dedicated relay data frame (step S420), and the base station 30 relays the "direct link transmission quality measurement completion" to the wireless communication device 20B (step S422).

Until the wireless communication device 20B receives the "direct link transmission quality measurement completion" from the wireless communication device 20A, it receives the probe frames including the TA in which the address of the wireless communication device 20A is described that are transmitted from the wireless communication device 20A, in addition to the probe frames including the RA in which the address of the wireless communication device 20B is described that are transmitted from the base station 30 (step S424).

Then, the wireless communication device 20B measures the average stream SNR of the received probe frames, and stores the average value in the memory 232. The stream SNR is the quality for each of the streams in the separated communication channel (showing the SNR of each element after calculation to perform signal separation), and is an effective channel quality indicator for MIMO communication. However, in the first operation example given here, as the probe frames transmitted by the wireless communication device 20A are Legacy frames, there is no need to perform stream separation.

The wireless communication device 20B that has completed the measurement of the probe frames transmits a "direct link transmission measurement report" frame, which is a dedicated relay data frame, to the wireless communication device 20A via the base station 30 as soon as preparation for the measurement report is completed (step S426 and step S428). The "direct link transmission measurement report" includes the MAC address of the base station 30, the average stream SNR of the probe frames whose TAs are the address of the base station 30, the MAC address of the wireless communication device 20A, and the average stream SNR of the probe frames whose TAs are the address of the wireless communication device 20A. When the wireless communication device 20A can receive and interpret the "direct link transmission measurement report" from the wireless communication device 20B, it proceeds to the reception quality measurement process.

FIG. 10 is an explanatory diagram that shows a specific example of a direct link transmission measurement report. As shown in FIG. 10, the wireless communication device 20B measures the SNR of the probe frames transmitted from the wireless communication device 20A for each communication function being used, and lists the measurement values on the direct link transmission measurement report. In the example shown in FIG. 9, as the wireless communication device 20A only transmitted Legacy probe frames, there are no particular listings apart from the 1 stream SNR.

Link quality measurement process: reception quality FIG. 11 is a sequence diagram that shows the flow of the reception quality measurement process according to the first operation example. As shown in FIG. 11, the wireless communication device 20A transmits a "direct link reception quality measurement request" frame, which is a dedicated relay data frame, to the wireless communication device 20B via the base station 30 (step S452 and step S454). The content of the "direct link reception quality measurement request" includes the MAC address of the base station 30 (BSSID) and the MAC address of the wireless communication device 20A. The "direct link reception quality measurement request" also includes the measurement pattern and the list of measurement items selected in the measurement method selection process. More specifically, the "direct link transmission quality measurement request" includes the measurement pattern for the probe frames transmitted by the wireless communication device 20B for the base station path and the direct link path respectively, the list of the number of streams to be measured, the list of the bandwidths to be measured, and the presence or not of the TxBF measurement option.

When the wireless communication device 20B can receive and interpret the "direct link reception quality measurement request", it transmits a "direct link reception quality measurement response", which is a dedicated relay data frame, to the wireless communication device 20A via the base station 30 (step S456 and step S458). The "direct link reception quality measurement response" includes information about whether or not the requested measurement is possible.

Then, if success and failure information included in the "direct link reception quality measurement response" indicates "measurable", the reception quality measurement is started of the probe frames transmitted from the wireless communication device 20B (step S460). After that, the wireless communication device 20B transmits Legacy probe frames including the RA in which the address of the base station 30 is described, the TA in which the address of the wireless communication device 20B is described and the DA in which the address of the wireless communication device 20A is described, a specified number of times. Further, the base station 30 changes the RA of the probe frames received from the wireless communication device 20B to the address of the wireless communication device 20A and changes the TA to the address of the base station 30 and transmits the probe frames (step S464, step S465 and step S466).

After that, the wireless communication device 20B transmits a "direct link reception quality measurement completion", which is a dedicated relay data frame (step S468), and the base station 30 relays the "direct link reception quality measurement completion" to the wireless communication device 20A (step S470).

Until the wireless communication device 20A receives the "direct link reception quality measurement completion" from the wireless communication device 20B, it receives both the probe frames transmitted from the base station 30 including the RA in which the address of the wireless communication device 20A is described, and the probe frames transmitted from the wireless communication device 20B including the TA in which the address of the wireless communication device 20B is described (step S472).

Then, the wireless communication device 20A measures the average stream SNR for the received probe frames, stores the average values in the memory 232, and ends the reception quality measurement. The link quality measurement process may be performed regularly after the path between the wireless communication device 20A and the wireless communication device 20B is determined, and the communication path and functions used may be changed as necessary.

Path Determination Process

Figure 12:
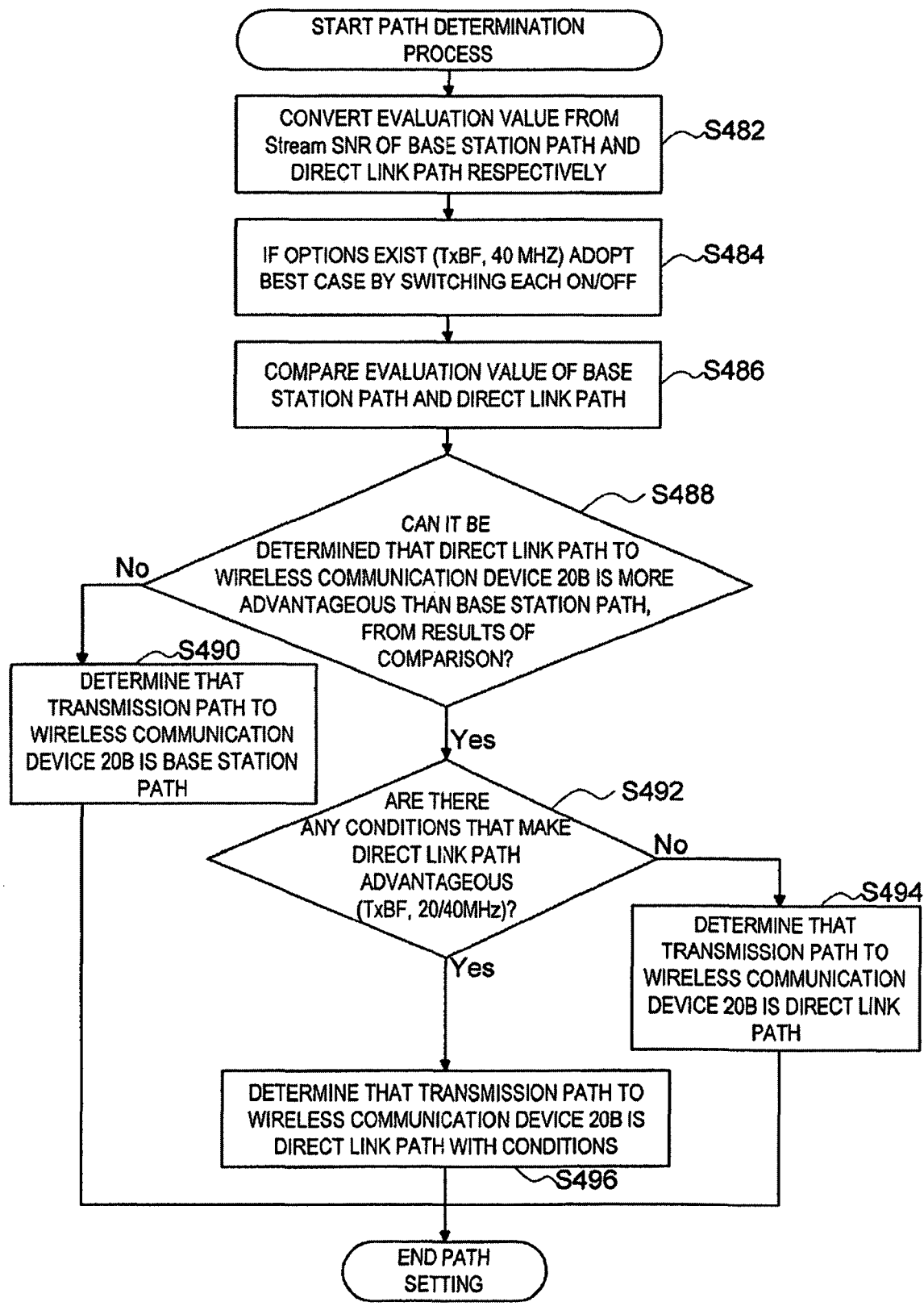
FIG. 12 is a flow chart that shows the flow of a path determination process.

FIG. 12 is a flow chart that shows the flow of the path determination process. The wireless communication device 20A obtains probe frame transmission quality and reception quality for both the base station path and the direct link path in the link quality measurement process. More specifically, the wireless communication device 20A, in addition to the "stream SNR for the link from the base station 30 to the wireless communication device 20B" and the "stream SNR for the link from the wireless communication device 20A to the wireless communication device 20B," also obtains information on the "stream SNR for the link from the base station 30 to the wireless communication device 20A" and the "stream SNR for the link from the wireless communication device 20B to the wireless communication device 20A."

Based on the above-described information, the wireless communication device 20A determines whether to use the base station path or the direct link path for frame transmission from the wireless communication device 20A to the wireless communication device 20B. As a quality evaluation in the present embodiment, the evaluation value is defined as the expected required transmission time. The following type of procedure can be considered as a procedure to calculate the evaluation value.

First, a known table or the like is used to calculate, from the stream SNR, a modulation and coding set (MCS) (for Legacy, this is the rate) that meets a certain packet error ratio (PER) in the stream SNR while also being the highest physical layer rate among the MCS that meet the PER. The physical layer rates of the MCS (rate, in the case of Legacy) are, for the respective paths, $PHYRATE_{wireless\ communication\ device\ 20A—wireless\ communication\ device\ 20B}$, $PHYRATE_{base\ station\ 30—wireless\ communication\ device\ 20A}$, and $PHYRATE_{base\ station\ 30—wireless\ communication\ device\ 20B}$.

In this case, the direct link path evaluation value and the base station path evaluation value can be expressed using the Formula 3 shown below (step S482).

Formula 3

Direct path evaluation value=1 / $PHYRATE_{wireless\ communication\ device\ 20A—wireless\ communication\ device\ 20B}$ Base station path evaluation value= $(1/PHYRATE_{base\ station\ 30—wireless\ communication\ device\ 20A})+(1/PHYRATE_{base\ station\ 30—wireless\ communication\ device\ 20B})$ (Formula 3)

When there are multiple streams of 2 or more streams, MCS is selected based on whether PER is met for each stream respectively. If both wireless communication devices 20A and 20B are compatible with TxBF, the assumed TxBF stream SNR obtained through measurement is evaluated in the same way. If both the wireless communication devices 20A and 20B are also compatible with the 40 MHz bandwidth, the stream SNR for the 40 MHz bandwidth obtained through measurement is evaluated in the same way. In the above described way, the smallest evaluation value is adopted from among the evaluation values respectively obtained when there are option functions and a plurality of streams (step S484). Then, the control portion 228 compares the evaluation value of the base station path adopted in step S484 with the evaluation value of the direct link path (step S486).

The control portion 228 compares the evaluation value of the base station path and the direct link path, and determines whether or not the following relationship is established: [direct link path evaluation value≤AP path evaluation value]. In other words, the control portion 228 determines whether or not the direct link path is more advantageous than the base station path (step S488). Then, if the control portion 228 determines that the relationship [direct link path evaluation value≤AP path evaluation value] is not established, it determines the communication path to the wireless communication device 20B to be the base station path (step S490).

Further, if the control portion 228 determines that the relationship [direct link path evaluation value≤the AP path evaluation value] is established, it further determines the presence or absence of conditions relating to the use of option functions, such as TxBF and the 40 MHz bandwidth, that make the direct link path more advantageous (step S492). Then, if the control portion 228 determines that there are no conditions, it determines the communication path to the wireless communication device 20B to be the direct link path (step S494). If the control portion 228 determines that there are conditions, it determines the communication path to the wireless communication device 20B to be the direct link path with conditions (step S496).

Hereinafter, communications can be performed with the wireless communication device 20B for which the DLS has been established using the path determined based on the evaluation of the advantages and disadvantages. If the path determined in the path determination process is the direct link path with conditions, the conditions are also notified to the hardware and are applied when using the path.

3-2. Second Operation Example

The first operation example of the wireless communication system 1 according to the present embodiment is described above. In the link quality measurement process of the first operation example, the transmission quality measurement and the reception quality measurement are performed using the measurement pattern #1, but in a second operation example, a point of difference is the use of a measurement pattern #2. Below, the transmission quality measurement process according to the second operation example will be explained with reference to FIG. 13 and FIG. 14. With regard to reception quality measurement, the direction of the probe frame transmission is reversed from that of the transmission quality measurement process. In other respects, the reception quality measurement process is made self-evident from the contents of the transmission quality measurement process, and an explanation is therefore omitted here.

FIG. 13 is a sequence diagram that shows the flow of the transmission quality measurement process according to the second operation example. As shown in FIG. 13, first the wireless communication device 20A transmits a "direct link transmission quality measurement request" frame, which is a dedicated relay data frame, to the wireless communication device 20B via the base station 30 (S502 and step S504). The content of the "direct link transmission quality measurement request" includes the MAC address of the base station 30 (BSSID) and the MAC address of the wireless communication device 20A. The "direct link transmission quality measurement request" also includes the measurement pattern and the list of measurement items selected in the measurement method selection process. More specifically, the "direct link transmission quality measurement request" includes the measurement pattern for the probe frames transmitted by the wireless communication device 20A for the base station path and the direct link path respectively, the list of the number of streams to be measured, the list of the bandwidths to be measured, and the presence or absence of the TxBF measurement option and the like.

When the wireless communication device 20B can receive and interpret the "direct link transmission quality measurement request", it transmits a "direct link transmission quality measurement response", which is a dedicated relay data frame, to the wireless communication device 20A via the base station 30 (step S506 and step S508). The "direct link transmission quality measurement response" includes information about whether or not the requested measurement is possible. This includes information about whether or not the assumed TxBF stream SNR can be measured in addition to the normal stream SNR. Then, the wireless communication device 20B starts the measurement of the transmission quality of the wireless communication device 20A (step S510).

Then, if success and failure information included in the "direct link transmission quality measurement response" indicates "measurable", the wireless communication device 20A starts to transmit a probe frame to cause the wireless communication device 20B to measure the transmission quality (step S512). More specifically, the wireless communication device 20A transmits a Legacy probe frame including the RA in which the address of the base station 30 is described, the TA in which the address of the wireless communication device 20A is described and the DA in which the address of the wireless communication device 20B is described, a specified number of times. The base station 30 changes the RA of each of the probe frames received from the wireless communication device 20A to the address of the wireless communication device 20B, changes the TA to the address of the base station 30, and transmits the probe frames (step S514, step S516 and step S518). The wireless communication device 20B receives the Legacy probe frames transmitted from the base station 30, and then measures and stores the stream SNR.

After that, if the T×BF test option is added to the "direct link transmission quality measurement request" (step S520), and if the wireless communication device 20B can measure the assumed T×BF stream SNR (in concrete terms, the estimation of the stream SNR in accordance with the calculation paradigm of the steering matrix shared with the transmission side), as well as performing the normal stream SNR measurement (step S522), then the wireless communication device 20B performs measurement of the normal stream SNR together with measurement of the assumed T×BF stream SNR (step S526). On the other hand, if the wireless communication device 20B cannot measure the assumed T×BF stream SNR as well as the normal stream SNR, it performs measurement of the normal stream SNR (step S524).

After that, the wireless communication device 20A sequentially transmits probe frames of differing formats to cover all the formats included in the direct link measurement list (number of streams, bandwidths) (step S528, step S530, step S532 and step S534). For example, if the direct link measurement list indicates compatibility with the number of streams 1 to 3, and with the 20 MHz and 40 MHz bandwidths, the wireless communication device 20A may sequentially transmit probe frames at MCS0 (1 stream), MCS8 (2 streams) and MCS16 (3 streams) at the 20 MHz frequency, and at MCS0 (1 stream), MCS8 (2 streams) and MCS16 (3 streams) at the 40 MHz frequency.

Next, if the T×BF test option is added to the "direct link transmission quality measurement request" (step S536) and the wireless communication device 20B cannot measure the assumed T x BF stream SNR as well as the normal stream SNR, the wireless communication device 20A proceeds to the process at step S540 (step S538). On the other hand, if the T×BF test option is not added to the "direct link transmission quality measurement request" or if the wireless communication device 20B can measure the assumed T×BF stream SNR as well as the normal stream SNR, the wireless communication device 20A proceeds to the process at step S558.

If the wireless communication device 20A determines in step S538 that the wireless communication device 20B cannot perform simultaneous measurement, it transmits a "start of T×BF measurement notification" (step S540 and step S542). When the wireless communication device 20B receives the "start of T×BF measurement notification," it transmits a "start of T×BF measurement response" in response to the "start of T×BF measurement notification" (step S544 and step S546).

When the wireless communication device 20A receives the "start of T×BF measurement response" from the wireless communication device 20B, it implements T×BF and sequentially transmits probe frames of differing formats to cover all the formats on the direct link measurement list determined in the measurement method selection process (number of streams, bandwidths) (step S548, step S552, step S554 and step S556). Meanwhile, the wireless communication device 20B, by receiving the "start of T×BF measurement notification" from the wireless communication device 20A, ascertains that T×BF probe frames are transmitted from the wireless communication device 20A, and starts measurement of the stream SNR of the probe frames (step S550). Then, the wireless communication device 20B stores the measured stream SNR in the memory 232 as data when T×BF is implemented.

After that, the wireless communication device 20A transmits a "direct link transmission quality measurement completion", which is a dedicated relay data frame (step S558), and the base station 30 relays the "direct link transmission quality measurement completion" to the wireless communication device 20B (step S560).

When the wireless communication device 20B receives the "direct link transmission quality measurement completion" it ends the transmission quality measurement (step S562). As soon as preparation for the measurement report is completed, the wireless communication device 20B transmits a "direct link transmission measurement report" frame, which is a dedicated relay frame, to the wireless communication device 20A via the base station 30 (step S564 and step S566). The "direct link transmission measurement report" includes the MAC address of the base station 30, the average stream SNR of the probe frames whose TAs are the address of the base station 30, the MAC address of the wireless communication device 20A, and the average stream SNR of the probe frames whose TAs are the address of the wireless communication device 20A. When the wireless communication device 20A can receive and interpret the "direct link transmission measurement report" from the wireless communication device 20B, it proceeds to the reception quality measurement process.

FIG. 14 is an explanatory diagram that shows a specific example of a direct link transmission measurement report. As shown in FIG. 14, the wireless communication device 20B measures the stream SNR of the probe frames transmitted from the wireless communication device 20A for each of the communication functions used, and lists the measurement values on the direct link transmission measurement report. In the example shown in FIG. 14, only Legacy probe frames are transmitted on the base station path, and so there are no particular listings apart from the 1 stream SNR. On the other hand, probe frames using normal streams (1 to 3 streams) and T×BF streams (1 to 3 streams) on the 20 MHz frequency are transmitted on the direct link path, and dB values are therefore shown in the applicable columns.

3-3. Third Operation Example

The second operation example of the wireless communication system 1 according to the present embodiment is described above. Next, the transmission quality measurement process according to a third operation example using a measurement pattern #3 will be explained with reference to FIG. 15. With regard to reception quality measurement, the direction of the probe frame transmission is reversed from that of the transmission quality measurement process. In other respects, the reception quality measurement process is made self-evident from the contents of the transmission quality measurement process, and an explanation is therefore omitted here.

FIG. 15 is a sequence diagram that shows the flow of the transmission quality measurement process according to the third operation example. First, the wireless communication device 20A transmits a "direct link transmission quality measurement request" frame, which is a dedicated relay data frame, to the wireless communication device 20B via the base station 30 (step S602 and step S604). The content of the "direct link transmission quality measurement request" includes the MAC address of the base station 30 (BSSID) and the MAC address of the wireless communication device 20A. The "direct link transmission quality measurement request" also includes the measurement pattern and the list measurement items selected in the measurement method selection process. More specifically, the "direct link transmission quality measurement request" includes a measurement pattern #3, the list of the number of streams to be measured, the list of the bandwidths to be measured, and the presence or absence of the TxBF measurement option and the like.

When the wireless communication device 20B can receive and interpret the "direct link transmission quality measurement request", it transmits a "direct link transmission quality measurement response", which is a dedicated relay data frame, to the wireless communication device 20A via the base station 30 (step S606 and step S608). The "direct link transmission quality measurement response" includes information about whether or not the requested measurement is possible. This includes information about whether or not the assumed TxBF stream SNR can be measured in addition to the normal stream SNR. Then, the wireless communication device 20B starts the measurement of the transmission quality of the wireless communication device 20A (step S609).

Then, if success and failure information included in the "direct link transmission quality measurement response" indicates "measurable", the wireless communication device 20A starts to transmit a probe frame to cause the wireless communication device 20B to measure the transmission quality (step S610). More specifically, the wireless communication device 20A transmits a probe frame including the RA in which the address of the base station 30 is described, the TA in which the address of the wireless communication device 20A is described and the DA in which the address of the wireless communication device 20B is described in accordance with the common measurement set. The base station 30 changes the RA of each of the probe frames received from the wireless communication device 20A to the address of the wireless communication device 20B, changes the TA to the address of the base station 30, and transmits the probe frames (step S612, step S614 and step S616). The wireless communication device 20B receives the probe frames transmitted from the base station 30 in accordance with the common measurement set and also directly receives the probe frames transmitted from the wireless communication device 20A in accordance with the common measurement set, measures the stream SNR and stores the values.

Next, if a TxBF test option is added to the "direct link transmission quality measurement request" (step S618) and if the wireless communication device 20B can measure the assumed TxBF stream SNR (in concrete terms, the estimation of the stream SNR in accordance with the calculation paradigm of the steering matrix shared with the transmission side), as well as performing the normal stream SNR measurement (step S620), then the wireless communication device 20B performs measurement of the normal stream SNR together with measurement of the assumed TxBF stream SNR (step S624). On the other hand, if the wireless communication device 20B cannot measure the assumed TxBF stream SNR as well as the normal stream SNR, it performs measurement of the normal stream SNR (step S622).

After that, the wireless communication device 20A sequentially transmits probe frames of differing formats to cover all the formats included in the direct link measurement list (number of streams, bandwidths) (step S626, step S628 step S630 and step S632). For example, if the direct link measurement list indicates compatibility with the number of streams 1 to 3, and with the 20 MHz and 40 MHz bandwidths, the wireless communication device 20A may sequentially transmit probe frames at MCS0 (1 stream), MCS8 (2 streams) and MCS16 (3 streams) at the 20 MHz frequency, and at MCS0 (1 stream), MCS8 (2 streams) and MCS16 (3 streams) at the 40 MHz frequency.

Next, if the TxBF test option is added to the "direct link transmission quality measurement request" (step S634) and the wireless communication device 20B cannot measure the assumed TxBF stream SNR as well as the normal stream SNR, the wireless communication device 20A proceeds to the process at step S638 (step S636). On the other hand, if the TxBF test option is not added to the "direct link transmission quality measurement request" or if the wireless communication device 20B can measure the assumed TxBF stream SNR as well as the normal stream SNR, the wireless communication device 20A proceeds to the process at step S658.

If the wireless communication device 20A determines in step S636 that the wireless communication device 20B cannot perform simultaneous measurement, it transmits a "start of TxBF measurement notification" (step S638 and step S640). When the wireless communication device 20B receives the "start of TxBF measurement notification," it transmits a "start of TxBF measurement response" in response to the "start of TxBF measurement notification" (step S642 and step S644).

When the wireless communication device 20A receives the "start of TxBF measurement response" from the wireless communication device 20B, it implements TxBF and sequentially transmits probe frames of differing formats to cover all the formats on the direct link measurement list determined in the measurement method selection process (number of streams, bandwidths) (step S648, step S652, step S654 and step S656). Meanwhile, the wireless communication device 20B, by receiving the "start of TxBF measurement notification" from the wireless communication device 20A, ascertains that TxBF probe frames are transmitted from the wireless communication device 20A, and starts measurement of the stream SNR of the probe frames (step S650). Then, the wireless communication device 20B stores the measured stream SNR in the memory 232 as data when TxBF is implemented.

Subsequently, the wireless communication device 20A transmits a "direct link transmission quality measurement completion" frame, which is a dedicated relay data frame (S658), and the base station 30 relays the "direct link transmission quality measurement completion" to the wireless communication device 20B (S660).

When the wireless communication device 20B receives the "direct transmission quality measurement completion" it ends measurement of the transmission quality (step S662). As soon as preparation for the measurement report is completed, the wireless communication device 20B transmits a "direct link transmission measurement report" frame, which is a dedicated relay frame, to the wireless communication device 20A via the base station 30 (step S664 and step S666). The "direct link transmission measurement report" includes the MAC address of the base station 30, the average stream SNR of the probe frames whose TAs are the address of the base station 30, the MAC address of the wireless communication device 20A, and the average stream SNR of the probe frames whose TAs are the address of the wireless communication device 20A. When the wireless communication device 20A can receive and interpret the "direct link transmission measurement report" from the wireless communication device 20B, it proceeds to the reception quality measurement process.

3-4. Fourth Operation Example

The third operation example of the wireless communication system 1 according to the present embodiment is described above. Next, the transmission quality measurement process according to a fourth operation example using a measurement pattern #4 will be described with reference to FIG. 16. With regard to reception quality measurement, the direction of the probe frame transmission is reversed from that of the transmission quality measurement process. In other respects, the reception quality measurement process is made self-evident from the contents of the transmission quality measurement process, and an explanation is therefore omitted here.

Figure 16:
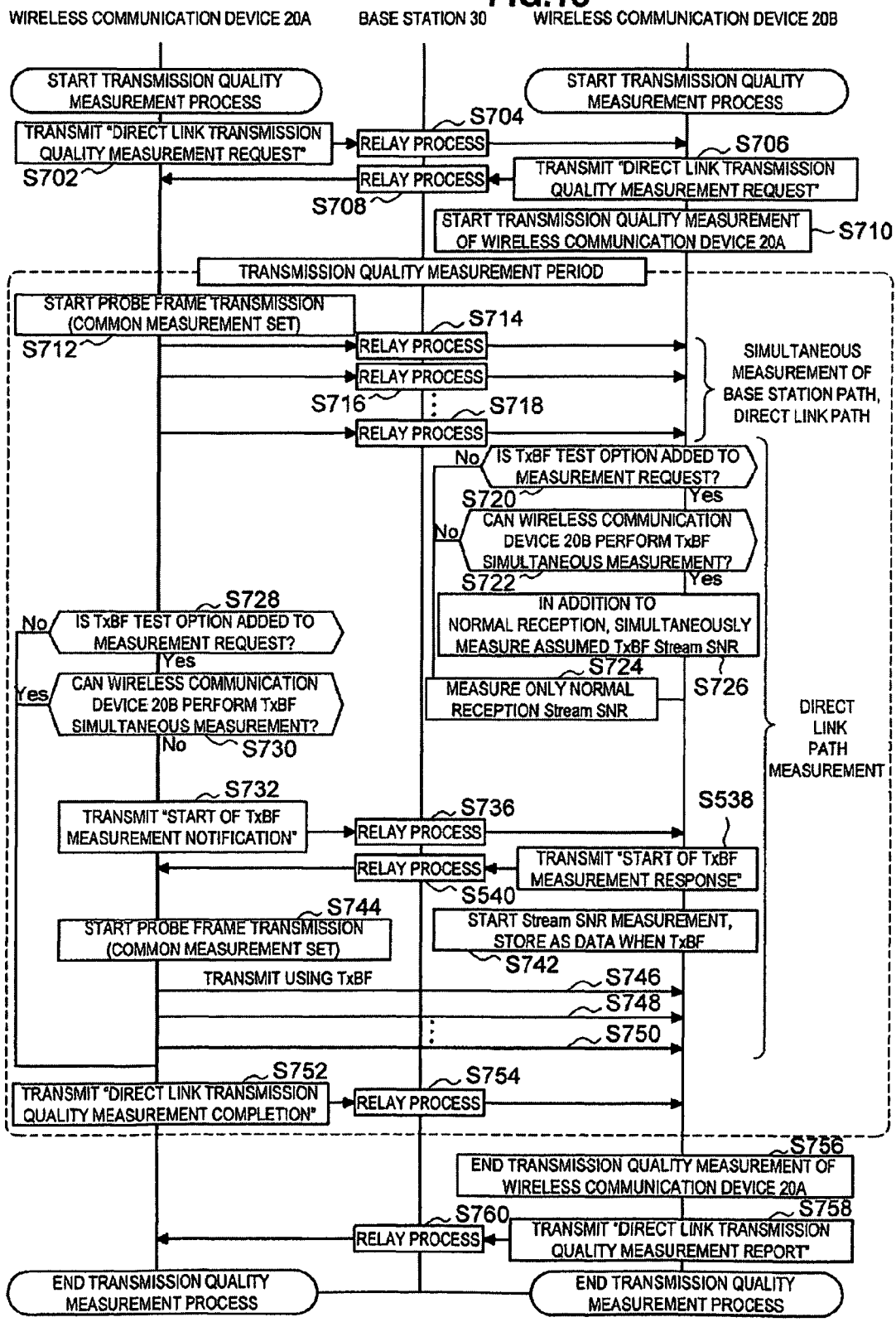
FIG. 16 is a sequence diagram that shows the flow of a transmission quality measurement process according to a fourth operation example.

FIG. 16 is a sequence diagram that shows the flow of the transmission quality measurement process according to the fourth operation example. First, the wireless communication device 20A transmits a "direct link transmission quality measurement request" frame, which is a dedicated relay data frame, to the wireless communication device 20B via the base station 30 (step S702 and step S704). The content of the "direct link transmission quality measurement request" includes the MAC address of the base station 30 (BSSID) and the MAC address of the wireless communication device 20A. The "direct link transmission quality measurement request" also includes the measurement pattern and the list measurement items selected in the measurement method selection process. More specifically, the "direct link transmission quality measurement request" includes the measurement pattern #4, the list of the number of streams to be measured, the list of the bandwidths to be measured, and the presence or absence of the T×BF measurement option and the like.

When the wireless communication device 20B can receive and interpret the "direct link transmission quality measurement request", it transmits a "direct link transmission quality measurement response", which is a dedicated relay data frame, to the wireless communication device 20A via the base station 30 (step S706 and step S708). The "direct link transmission quality measurement response" includes information about whether or not the requested measurement is possible. This includes information about whether or not the assumed T×BF stream SNR can be measured in addition to the normal stream SNR. Then, the wireless communication device 20B starts the measurement of the transmission quality of the wireless communication device 20A (step S710).

Then, if success and failure information included in the "direct link transmission quality measurement response" indicates "measurable", the wireless communication device 20A starts to transmit a probe frame to cause the wireless communication device 20B to measure the transmission quality (step S712). More specifically, the wireless communication device 20A transmits a probe frame including the RA in which the address of the base station 30 is described, the TA in which the address of the wireless communication device 20A is described and the DA in which the address of the wireless communication device 20B is described in accordance with the common measurement set. The base station 30 changes the RA of each of the probe frames received from the wireless communication device 20A to the address of the wireless communication device 20B, changes the TA to the address of the base station 30, and transmits the probe frames (step S714, step S716 and step S718). The wireless communication device 20B receives the probe frames transmitted from the base station 30 in accordance with the common measurement set and also directly receives the probe frames transmitted from the wireless communication device 20A in accordance with the common measurement set, measures the stream SNR and stores the measurement values.

After that, if the T×BF test option is added to the "direct link transmission quality measurement request" (step S720), and if the wireless communication device 20B can measure the assumed T×BF stream SNR (in concrete terms, the estimation of the stream SNR in accordance with the calculation paradigm of the steering matrix shared with the transmission side), as well as performing the normal stream SNR measurement (step S722), then the wireless communication device 20B performs measurement of the normal stream SNR together with measurement of the assumed T×BF stream SNR (step S726). On the other hand, if the wireless communication device 20B cannot measure the assumed T×BF stream SNR as well as the normal stream SNR, it performs measurement of the normal stream SNR (step S724).

Next, if the T×BF test option is added to the "direct link transmission quality measurement request" (step S728) and the wireless communication device 20B cannot measure the assumed T×BF stream SNR as well as the normal stream SNR, the wireless communication device 20A proceeds to the process at step S732 (step S730). On the other hand, if the T×BF test option is not added to the "direct link transmission quality measurement request" or if the wireless communication device 20B can measure the assumed T×BF stream SNR as well as the normal stream SNR, the wireless communication device 20A proceeds to the process at step S752.

If the wireless communication device 20A determines in step S730 that the wireless communication device 20B cannot perform simultaneous measurement, it transmits a "start of T×BF measurement notification" (step S732 and step S736). When the wireless communication device 20B receives the "start of T×BF measurement notification," it transmits a "start of T×BF measurement response" in response to the "start of T×BF measurement notification" (step S738 and step S740).

When the wireless communication device 20A receives the "start of T×BF measurement response" from the wireless communication device 20B, it implements T×BF and sequentially transmits probe frames of differing formats to cover all the formats on the direct link measurement list determined in the measurement method selection process (number of streams, bandwidths) (step S744, step S746, step S748 and step S750). Meanwhile, the wireless communication device 20B, by receiving the "start of T×BF measurement notification" from the wireless communication device 20A, ascertains that T×BF probe frames are transmitted from the wireless communication device 20A, and starts measurement of the stream SNR of the probe frames (step S742). Then, the wireless communication device 20B stores the measured stream SNR in the memory 232 as data when T×BF is implemented.

After that, the wireless communication device 20A transmits a "direct link transmission quality measurement completion", which is a dedicated relay data frame (step S752), and the base station 30 relays the "direct link transmission quality measurement completion" to the wireless communication device 20B (step S754).

When the wireless communication device 20B receives the "direct link transmission quality measurement completion" it ends the transmission quality measurement (step S756). As soon as preparation for the measurement report is completed, the wireless communication device 20B transmits a "direct link transmission measurement report" frame, which is a dedicated relay frame, to the wireless communication device 20A via the base station 30 (step S758 and step S760). The "direct link transmission measurement report" includes the MAC address of the base station 30, the average stream SNR of the probe frames whose TAs are the address of the base station 30, the MAC address of the wireless communication device 20A, and the average stream SNR of the probe frames whose TAs are the address of the wireless communication device 20A. When the wireless communication device 20A can receive and interpret the "direct link transmission measurement report" from the wireless communication device 20B, it proceeds to the reception quality measurement process.

3-5. Fifth Operation Example

The first to fourth operation examples of the wireless communication system 1 according to the present embodiment are described above. In the operation examples described above, the measurement pattern differs according to whether or not the base station 30 is HT compatible. Here, a fifth operation example differs in that the measurement pattern is decided irrespective of the functions of the base station 30 and probe frames are transmitted independently on the base station path and the direct link path. Hereinafter, the fifth operation example will be explained with reference to FIG. 17 and FIG. 18.

Measurement Method Selection Process

Figure 17:
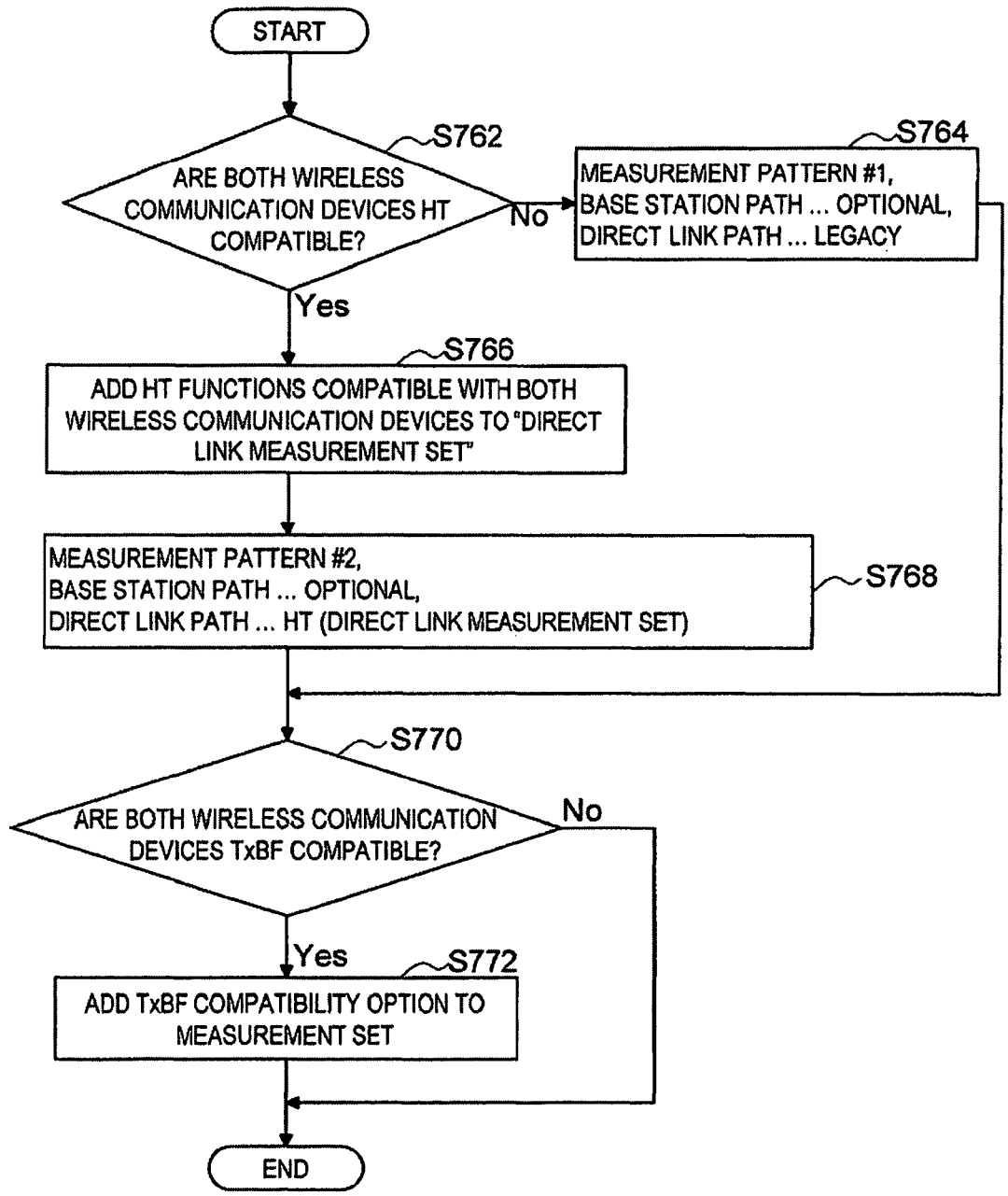
FIG. 17 is a flow chart that shows the flow of a measurement method selection process according to a fifth operation example.

FIG. 17 is a flow chart that shows the flow of the measurement method selection process according to the fifth operation example. As shown in FIG. 17, first the control portion 228 of the wireless communication device 20A refers to the information about the capabilities of the wireless communication device 20B stored in the memory 232 and determines whether or not both the wireless communication device 20A and the wireless communication device 20B are HT compatible (step S762). Then, if the control portion 228 determines that both the wireless communication devices 20A and 20B are not HT compatible, it sets the base station path to optional method and the direct path to Legacy as a measurement pattern #1 (step S764).

On the one hand, if the control portion 228 determines that both the wireless communication devices 20A and 20B are HT compatible, it adds the HT functions with which both the wireless communication devices 20A and 20B are compatible to a "direct link measurement set" (step S766). For example, the number of streams for the modulation and coding set (MCS) with which both the wireless communication devices 20A and 20B are compatible, and the bandwidths (20 MHz, 40 MHz) are added to the "direct link measurement set."

Next, the control portion 228 sets the base station path to optional and the direct path to the above-described "direct link measurement set" as a measurement pattern #2 (step S768). Then, after step S764 and step S768, the control portion 228 determines whether or not both the wireless communication devices 20A and 20B are TxBF compatible (step S770). If both the wireless communication devices 20A and 20B are TxBF compatible, TxBF is added as an option to the direct path measurement set (step S772).

Next, the transmission quality measurement process when the measurement pattern #2 is selected in the above-described measurement method selection process will be explained with reference to FIG. 18.

Figure 18:
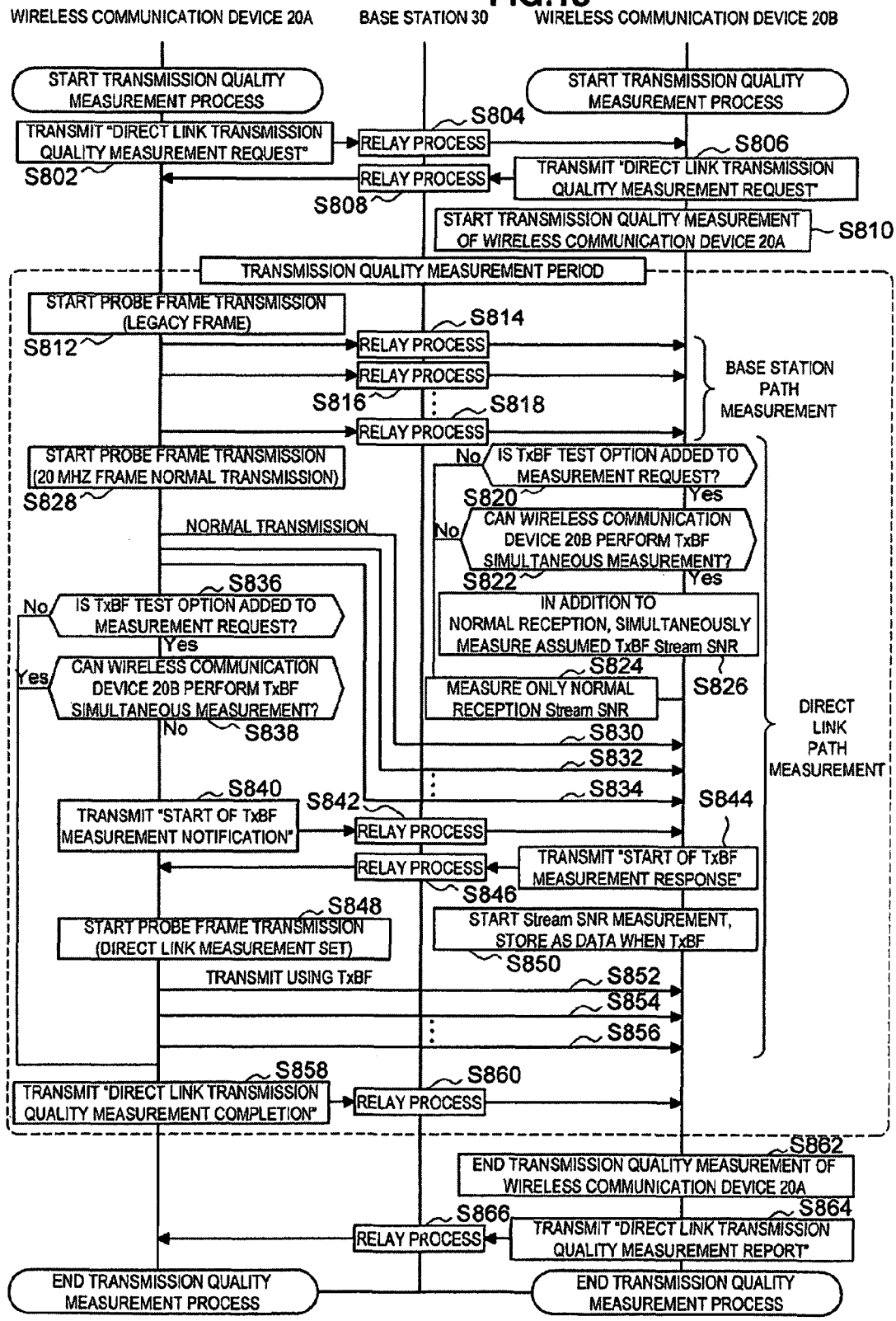
FIG. 18 is a sequence diagram that shows the flow of a transmission quality measurement process according to the fifth operation example.

FIG. 18 is a sequence diagram that shows the flow of the transmission quality measurement process according to the fifth operation example. First, the wireless communication device 20A transmits a "direct link transmission quality measurement request" frame, which is a dedicated relay data frame, to the wireless communication device 20B via the base station 30 (step S802 and step S804). The content of the "direct link transmission quality measurement request" includes the MAC address of the base station 30 (BSSID) and the MAC address of the wireless communication device 20A. The "direct link transmission quality measurement request" also includes the measurement pattern and the list measurement items selected in the measurement method selection process. More specifically, the "direct link transmission quality measurement request" includes the measurement pattern #2 according to the fifth operation example, the list of the number of streams to be measured, the list of the bandwidths to be measured, and the presence or absence of the TxBF measurement option and the like.

When the wireless communication device 20B can receive and interpret the "direct link transmission quality measurement request", it transmits a "direct link transmission quality measurement response", which is a dedicated relay data frame, to the wireless communication device 20A via the base station 30 (step S806 and step S808). The "direct link transmission quality measurement response" includes information about whether or not the requested measurement is possible. This includes information about whether or not the assumed TxBF stream SNR can be measured in addition to the normal stream SNR. Then, the wireless communication device 20B starts the measurement of the transmission quality of the wireless communication device 20A (step S810).

Then, if success and failure information included in the "direct link transmission quality measurement response" indicates "measurable", the wireless communication device 20A starts to transmit a probe frame to cause the wireless communication device 20B to measure the transmission quality (step S812). More specifically, the wireless communication device 20A transmits an optional (for example, a Legacy) probe frame including the RA in which the address of the base station 30 is described, the TA in which the address of the wireless communication device 20A is described and the DA in which the address of the wireless communication device 20B is described, a specified number of times. The base station 30 changes the RA of each of the probe frames received from the wireless communication device 20A to the address of the wireless communication device 20B, changes the TA to the address of the base station 30, and transmits the probe frames (step S814, step S816 and step S818). The wireless communication device 20B receives the Legacy probe frames transmitted from the base station 30, measures the stream SNR and stores the measurement values.

After that, if the TxBF test option is added to the "direct link transmission quality measurement request" (step S820), and if the wireless communication device 20B can measure the assumed TxBF stream SNR (in concrete terms, the estimation of the stream SNR in accordance with the calculation paradigm of the steering matrix shared with the transmission side), as well as performing the normal stream SNR measurement (step S822), then the wireless communication device 20B performs measurement of the normal stream SNR together with measurement of the assumed TxBF stream SNR (step S826). On the other hand, if the wireless communication device 20B cannot measure the assumed TxBF stream SNR as well as the normal stream SNR, it performs measurement of the normal stream SNR (step S824).

After that, the wireless communication device 20A sequentially transmits probe frames of differing formats to cover all the formats included in the direct link measurement list (number of streams, bandwidths) (step S828, step S830, step S832 and step S834). For example, if the direct link measurement list indicates compatibility with the number of streams 1 to 3, and with the 20 MHz and 40 MHz bandwidths, the wireless communication device 20A may sequentially transmit probe frames at MCS0 (1 stream), MCS8 (2 streams) and MCS16 (3 streams) at the 20 MHz frequency, and at MCS0 (1 stream), MCS8 (2 streams) and MCS16 (3 streams) at the 40 MHz frequency, Next, if the TxBF test option is added to the "direct link transmission quality measurement request" (step S836) and the wireless communication device 20B cannot measure the assumed TxBF stream SNR as well as the normal stream SNR, the wireless communication device 20A proceeds to the process at step S840 (step S838). On the other hand, if the TxBF test option is not added to the "direct link transmission quality measurement request" or if the wireless communication device 20B can measure the assumed TxBF stream SNR as well as the normal stream SNR, the wireless communication device 20A proceeds to the process at step S858.

If the wireless communication device 20A determines in step S838 that the wireless communication device 20B cannot perform simultaneous measurement, it transmits a "start of TxBF measurement notification" (step S840 and step S842). When the wireless communication device 20B receives the "start of TxBF measurement notification," it transmits a "start of TxBF measurement response" in response to the "start of TxBF measurement notification" (step S844 and step S846).

When the wireless communication device 20A receives the "start of TxBF measurement response" from the wireless communication device 20B, it implements TxBF and sequentially transmits probe frames of differing formats to cover all the formats on the direct link measurement list determined in the measurement method selection process (number of streams, bandwidths) (step S850, step S852, step S854 and step S856). Meanwhile, the wireless communication device 20B, by receiving the "start of TxBF measurement notification" from the wireless communication device 20A, ascertains that TxBF probe frames are transmitted from the wireless communication device 20A, and starts measurement of the stream SNR of the probe frames (step S848). Then, the wireless communication device 20B stores the measured stream SNR in the memory 232 as data when TxBF is implemented.

After that, the wireless communication device 20A transmits a "direct link transmission quality measurement completion", which is a dedicated relay data frame (step S858), and the base station 30 relays the "direct link transmission quality measurement completion" to the wireless communication device 20B (step S860).

When the wireless communication device 20B receives the "direct link transmission quality measurement completion" it ends the transmission quality measurement (step S862). As soon as preparation for the measurement report is completed, the wireless communication device 20B transmits a "direct link transmission measurement report" frame, which is a dedicated relay frame, to the wireless communication device 20A via the base station 30 (step S864 and step S866). The "direct link transmission measurement report" includes the MAC address of the base station 30, the average stream SNR of the probe frames whose TAs are the address of the base station 30, the MAC address of the wireless communication device 20A, and the average stream SNR of the probe frames whose TAs are the address of the wireless communication device 20A. When the wireless communication device 20A can receive and interpret the "direct link transmission measurement report" from the wireless communication device 20B, it proceeds to the reception quality measurement process. With regard to reception quality measurement, the direction of the probe frame transmission is reversed from that of the transmission quality measurement process. In other respects, the reception quality measurement process is made self-evident from the contents of the transmission quality measurement process, and an explanation is therefore omitted here.

4. Conclusion

As described above, the wireless communication system 1 according to the present embodiment can make an appropriate selection between one of the base station path and the direct link path based on the link quality, even when an HT format, such as a plurality of IEEE802.11n standard streams is used. Also, with the wireless communication system 1 according to the present embodiment, link quality can be compared when, for example, IEEE802.11n standard option functions are used. Further, the wireless communication system 1 according to the present embodiment can make an appropriate selection between one of the base station path and the direct link path based on the link quality without the base station 30 being equipped with special functions.

It should be understood by those skilled in the art that various modifications, combinations, sub-combinations and alterations may occur depending on design requirements and other factors insofar as they are within the scope of the appended claims or the equivalents thereof.

There is no need to perform respective processing steps of the wireless communication system 1 in time series along the order described in the flow charts and sequence diagrams. For example, the respective processing steps of the wireless communication system 1 may include processing that is performed in parallel or separately (for example, parallel processing or object processing).

What is claimed is:

1. A wireless communication system that comprises a first wireless communication device, a second wireless communication device, and a base station that relays wireless communication between the first and the second wireless communication devices, wherein the first wireless communication device and the second wireless communication device perform both indirect communication via the base station and direct communication that does not pass via the base station, the first wireless communication device obtains at least two different mutually compatible communication functions with which the first wireless communication device and the second wireless communication device are mutually compatible, and the first wireless communication device transmits by both the direct communication and indirect communication at least two data frames each comprising at least one of audio data, visual data, video game data, and software using at least two of the at least two mutually compatible communication functions, the second wireless communication device measures communication quality of the at least two data frames transmitted from the first wireless communication device for both the direct communication and the indirect communication, and at least one of the first wireless communication device and the second wireless communication device determines whether to establish communication by one of the indirect communication or the direct communication between the first wireless communication device and the second wireless communication device, based on a determined communication quality of each of the at least two mutually compatible communication functions.

2. The wireless communication system according to claim 1, wherein
the first wireless communication device transmits a first data frame of the at least two data frames to the base station using at least one of the at least two mutually compatible communication functions,
the base station transmits to the second wireless communication device the first data frame comprising at least one of audio data, visual data, video game data, and software received from the first wireless communication device, and
the second wireless communication device measures the communication quality of both a second data frame received directly from the first wireless communication device and the first data frame received indirectly from the base station.

3. The wireless communication system according to claim 2, wherein the first wireless communication device transmits the second data frame directly to the second wireless communication device using a multiple-input multiple-output (MIMO) communication function with which the first wireless communication device and the second wireless communication device are compatible and with which the base station is not compatible.

4. The wireless communication system according to claim 1, wherein
the first wireless communication device transmits a first data frame of the at least two data frames to the base station using a communication function with which the first wireless communication device, the second wireless communication device and the base station are compatible and also transmits a second data frame directly to the second wireless communication device using a multiple-input multiple-output (MIMO) communication function with which the first wireless communication device and the second wireless communication device are compatible,
the base station transmits the first data frame received from the first wireless communication device to the second wireless communication device, and
the second wireless communication device sequentially measures the communication quality of both the first data frame and the second data frame received from the first wireless communication device.

5. The wireless communication system according to claim 1, wherein the second wireless communication device transmits the measured communication quality to the first wireless communication device, and
the first wireless communication device determines, based on the communication quality received from the second wireless communication device, whether to perform the indirect communication or the direct communication.

6. The wireless communication system according to claim 1, wherein
the second wireless communication device measures each spatial stream that can be obtained by separating the communication channel as the communication quality.

7. The wireless communication system according to claim 1, wherein
the measurement of the communication quality by the second wireless communication device is intermittently performed after communication is established between the first wireless communication device and the second wireless communication device.

8. The wireless communication system according to claim 1, wherein the at least two data frames is transmitted by the first wireless communication device using a beam forming function.

9. The wireless communication system according to claim 1, wherein the direct communication uses a unique DLS setting process.

10. A first wireless communication device that performs of one of indirect communication with a second wireless communication device via a base station and direct communication with the second wireless communication device without passing via the base station, comprising:
an acquisition portion that obtains at least two different mutually compatible communication functions with which the first wireless communications device and the second wireless communication device is compatible;
a transmitting portion that transmits by both the direct communication and indirect communication at least two data frames each comprising at least one of audio data, visual data, video game data, and software using at least two of the at least two mutually compatible communication functions; and
a determination portion that, based on a communication quality of the at least two data frames measured by the second wireless communication device to determine whether to perform the indirect communication or the direct communication.

11. The first wireless communication device of claim 10, comprising a selection portion that, based on the communication function obtained by the acquisition portion, selects at least one of the multiple-input multiple-output (MIMO) communication functions with which both the first wireless communication device and the second wireless communication device are compatible.

12. The first wireless communication device according to claim 10, wherein the determination portion determines one of a use and non-use of the communication function of the at least two mutually compatible communication functions.

13. A first wireless communication device that performs of one of indirect communication with a second wireless communication device via a base station and direct communication with the second wireless communication device without passing via the base station, comprising:
a transmitting portion that transmits to the second wireless communication device at least two mutually compatible communication functions;
a receiving portion that receives at least two data frames each comprising at least one of audio data, visual data, video game data, and software transmitted from the second wireless communication device using at least two of the at least two mutually compatible communication functions; and
a measuring portion that measures a communication quality of the at least two data frames received by the receiving portion for each of the at least two mutually compatible communication functions used; wherein
the transmitting portion transmits the communication quality measured by the measuring portion to the second wireless communication device.

14. The first wireless communication device according to claim 13, wherein the transmitting portion transmits using multiple-input multiple-output (MIMO) which is compatible with both the first wireless communication device and the second wireless communication device.

15. A wireless communication method used by a wireless communication system that comprises a first wireless communication device, a second wireless communication device, and a base station that relays wireless communication between the first and the second wireless communication devices, the wireless communication method comprising the steps of:
- acquiring, by the first wireless communication device at least two different mutually compatible communication functions with which the first wireless communication device and the second wireless communication device are compatible;
- transmitting by both direct communication and indirect communication from the first wireless communication device, at least two data frames each comprising at least one of audio data, visual data, video game data, and software using at least two of the at least two mutually compatible communication functions;
- measuring, by the second wireless communication device, communication quality of the at least two data frames transmitted from the first wireless communication device for both the direct communication and the indirect communication; and
- determining, by one of the first communication device and the second wireless communication device, whether to establish communication by the indirect communication or the direct communication between the first wireless communication device and the second wireless communication device, based on a determined communication quality of each of the at least two mutually compatible communication functions.

16. The wireless communication method according to claim 15, wherein the at least two different mutually compatible communication functions are multiple-input multiple output (MIMO) type communication functions.

17. A non-transitory program comprising instructions that command a computer, that is a wireless communication device that performs one of indirect communication with another wireless communication device via a base station and direct communication with the other wireless communication device that does not pass via the base station, to function as a:
- selection portion that selects at least two different mutually compatible communication functions with which the first wireless communication device and the second wireless communication device are compatible;
- a transmitting portion that transmits by both direct communication and indirect communication at least two data frames each comprising at least one of audio data, visual data, video game data, and software using the at least two mutually compatible communication functions selected by the selection portion; and
- a determining portion that determines whether to establish communication by the indirect communication or the direct communication between the first wireless communication device and the second wireless communication device, based on communication quality of the transmitted at least two data frames measured by the second wireless communication device for each of the at least two mutually compatible communication functions used.

* * * * *